(12) United States Patent
Theodosakis et al.

(10) Patent No.: US 12,447,829 B2
(45) Date of Patent: Oct. 21, 2025

(54) CONTROLLING VEHICLES BASED ON CURRENT LOCATIONS AND CURRENT MOTION CHARACTERISTICS

(71) Applicant: Textron Innovations Inc., Providence, RI (US)

(72) Inventors: Gregory August Theodosakis, Martinez, GA (US); Russell William King, Evans, GA (US); Jonathan Daniel Bowen, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 146 days.

(21) Appl. No.: 18/545,315

(22) Filed: Dec. 19, 2023

(65) Prior Publication Data

US 2025/0196655 A1    Jun. 19, 2025

(51) Int. Cl.
*B60L 15/20* (2006.01)

(52) U.S. Cl.
CPC ........... *B60L 15/20* (2013.01); *B60L 2200/22* (2013.01); *B60L 2240/12* (2013.01); *B60L 2240/461* (2013.01); *B60L 2240/622* (2013.01); *B60L 2260/42* (2013.01)

(58) Field of Classification Search
CPC .. B60L 15/20; B60L 2200/22; B60L 2240/12; B60L 2240/461; B60L 2240/622; B60L 2260/42
See application file for complete search history.

(56) References Cited

U.S. PATENT DOCUMENTS

| | | | |
|---|---|---|---|
| 4,679,808 A * | 7/1987 | Ito | B60T 8/172 701/1 |
| 5,558,163 A * | 9/1996 | Hollstein | A01B 71/02 172/4 |
| 5,869,943 A * | 2/1999 | Nakashima | B60T 8/4827 318/587 |
| 6,181,253 B1 * | 1/2001 | Eschenbach | G08B 21/245 340/8.1 |
| 7,121,563 B1 | 10/2006 | Liao | |
| 7,387,133 B1 | 6/2008 | True et al. | |
| 7,480,569 B2 | 1/2009 | Wehrlen et al. | |
| 7,581,740 B1 | 9/2009 | Stimely | |
| 7,823,956 B2 | 11/2010 | Jones et al. | |
| 7,894,957 B2 | 2/2011 | Carlson | |

(Continued)

FOREIGN PATENT DOCUMENTS

| | | | | |
|---|---|---|---|---|
| JP | 2008054441 A | * | 3/2008 | ............. B60L 11/18 |
| JP | 2012249365 A | * | 12/2012 | ............. B60L 11/18 |

*Primary Examiner* — Gertrude Arthur Jeanglaude
(74) *Attorney, Agent, or Firm* — BainwoodHuang

(57) ABSTRACT

A technique is directed to controlling vehicle motion. The technique involves setting a set of motion control parameters which controls motion of the utility vehicle to a set of initial values. The technique further involves receiving stability control inputs which include a geolocation signal identifying a current location of the utility vehicle and a set of motion signals identifying a set of current motion characteristics of the utility vehicle. The technique further involves changing, based on the geolocation signal and the set of motion signals, at least one motion control parameter of the set of motion control parameters which controls motion of the utility vehicle from an initial value to an updated value which is different from the initial value.

17 Claims, 8 Drawing Sheets

(56) References Cited

U.S. PATENT DOCUMENTS

| | | |
|---|---|---|
| 8,209,075 B2 | 6/2012 | Senneff et al. |
| 8,229,639 B2 | 7/2012 | Craig et al. |
| 8,350,758 B1 * | 1/2013 | Parvizi ............... G01S 5/02526 |
| | | 342/464 |
| 8,365,850 B2 | 2/2013 | Gal et al. |
| 8,589,049 B2 | 11/2013 | Craig |
| 8,672,342 B2 | 3/2014 | Mccarthy |
| 8,775,066 B2 | 7/2014 | Raymond |
| 8,905,426 B2 | 12/2014 | Holder |
| 9,050,879 B2 | 6/2015 | Guzzetta |
| 9,116,782 B2 | 8/2015 | Pierfelice et al. |
| 9,162,695 B2 | 10/2015 | Tran |
| 9,174,570 B2 | 11/2015 | Gasper |
| 9,199,147 B2 | 12/2015 | Azizi |
| 9,314,683 B2 | 4/2016 | Lee et al. |
| 9,421,440 B1 | 8/2016 | Chau |
| 9,770,636 B1 | 9/2017 | Wu |
| 9,802,621 B2 | 10/2017 | Gillingham et al. |
| 9,869,999 B2 | 1/2018 | Doane et al. |
| 10,197,999 B2 | 2/2019 | Doane et al. |
| 10,343,504 B1 | 7/2019 | Seitz, Jr. et al. |
| 10,471,313 B2 | 11/2019 | Tran |
| 10,471,314 B1 | 11/2019 | Tran |
| 10,538,232 B2 | 1/2020 | Liggins et al. |
| 10,898,771 B2 | 1/2021 | Vanlandingham et al. |
| 10,953,905 B2 | 3/2021 | Tse |
| 10,967,875 B2 | 4/2021 | Vanlandingham et al. |
| 11,048,255 B2 | 6/2021 | Lee et al. |
| 11,049,412 B2 | 6/2021 | Doherty et al. |
| 11,156,999 B2 | 10/2021 | Lee |
| 11,192,548 B2 | 12/2021 | Magolan et al. |
| 11,194,343 B2 | 12/2021 | Hsu et al. |
| 11,420,617 B2 | 8/2022 | Gaither |
| 11,420,652 B2 | 8/2022 | Connell et al. |
| 11,543,834 B2 | 1/2023 | Nobukawa et al. |
| 11,565,750 B2 | 1/2023 | Chang et al. |
| 11,584,208 B2 | 2/2023 | Seitz et al. |
| 11,597,324 B2 | 3/2023 | Zhang |
| 2005/0046584 A1 * | 3/2005 | Breed ............... B60N 2/02246 |
| | | 340/13.31 |
| 2014/0196967 A1 | 7/2014 | Chang et al. |
| 2021/0004004 A1 | 1/2021 | Whitfield, Jr. et al. |
| 2022/0295708 A1 | 9/2022 | Voelp, IV et al. |
| 2022/0306073 A1 | 9/2022 | King |
| 2022/0306119 A1 | 9/2022 | Weston et al. |
| 2022/0332317 A1 | 10/2022 | Lewandowski et al. |
| 2022/0379182 A1 | 12/2022 | Hsu |
| 2023/0058057 A1 | 2/2023 | Tyrer et al. |

* cited by examiner

CONTROLLING VEHICLES BASED ON CURRENT LOCATIONS AND CURRENT MOTION CHARACTERISTICS

BACKGROUND

A conventional electric golf cart includes a motor controller and an electric motor which is controlled by the motor controller. The electric motor mechanically connects to the golf cart's drive wheels through the drivetrain. To drive the electric motor and thus move the golf cart, the motor controller provides signals to operate the electric motor in response to sensed depression of the accelerator pedal.

Along these lines, as the operator of the golf cart further depresses the accelerator pedal, the motor controller is programmed to increase the speed of the electric motor and thus increase the speed of the golf cart. However, the motor controller is also programmed to restrict the golf cart from going over an overall top golf cart speed (e.g., 18 mph) as a safety measure. Accordingly, if the operator of the golf cart fully depresses the accelerator pedal, the electric motor of the golf cart may move the golf cart forward but no faster than the overall top golf cart speed.

SUMMARY

It should be understood that there are deficiencies to the above-described conventional approach which simply restricts a golf cart from going over an overall top golf cart speed as a safety measure. Along these lines, in certain areas and under certain conditions, the golf cart traveling at the overall top golf cart speed can still create uncomfortable sensations for the golf cart's occupants such as when taking a sharp corner on a cart path, when descending over a steep narrow bridge, when driving laterally on the side of an embankment, and so on. In a severe case, the golf cart may even become unsafe and create an undesirable incident.

One possible way to address such situations is to program the motor controller of the electric golf cart with an overall lower top golf cart speed (e.g., use a top golf cart speed of 12 mph rather than 18 mph in all situations). Unfortunately, there is a significant tradeoff to reducing the top golf cart speed in all situations. In particular, with an overall lower top golf cart speed, it will now take longer to traverse distances even when the golf cart is riding over flat sturdier terrain on which it is still safe to travel at a higher speed.

Improved techniques are directed to controlling a vehicle based on the vehicle's current location and one or more current motion characteristics (e.g., vehicle pitch, angular velocity about a particular axis, steering wheel rotation, combinations thereof, etc.). Along these lines, the vehicle may operate within a geographical region which includes one or more stability control geofences. When the vehicle enters such a stability control geofence, the vehicle performs a stability assessment (e.g., an evaluation of current motion characteristics) and, if the stability assessment indicates that the vehicle has encountered a reduced stability event (e.g., sharp cornering behavior, a steep forward pitch, extensive steering wheel rotation, combinations thereof, etc.), the vehicle updates a set of motion control parameters which controls vehicle motion to improve vehicle stability. Example motion control parameters include the vehicle's speed limit, acceleration rate, deceleration rate, and the like. In some arrangements, the amount of the limiting adjustment(s) is/are based on the intensity of the reduced stability event. With the vehicle being configured to change the value of one or more motion control parameters in such a situation, the vehicle may enjoy less restrictive motion control in other situations for convenience (e.g., when traveling outside of any stability control geofence, when traveling within a stability control geofence without encountering any reduced stability event, etc.).

One embodiment is directed to a method of controlling a utility vehicle. The method includes setting a set of motion control parameters which controls motion of the utility vehicle to a set of initial values. The method further includes receiving stability control inputs which include a geolocation signal identifying a current location of the utility vehicle and a set of motion signals identifying a set of current motion characteristics of the utility vehicle. The method further includes changing, based on the geolocation signal and the set of motion signals, at least one motion control parameter of the set of motion control parameters which controls motion of the utility vehicle from an initial value to an updated value which is different from the initial value.

Another embodiment is directed to electronic circuitry to control a utility vehicle. The electronic circuitry includes an electric motor, motor control circuitry constructed and arranged to operate the electric motor for vehicle propulsion, and a controller coupled with the motor control circuitry. The controller is constructed and arranged to perform a method of:

(A) setting, within the motor control circuitry, a set of motion control parameters which controls motion of the utility vehicle to a set of initial values, (B) receiving stability control inputs which include a geolocation signal identifying a current location of the utility vehicle and a set of motion signals identifying a set of current motion characteristics of the utility vehicle, and (C) based on the geolocation signal and the set of motion signals, changing, within the motor control circuitry, at least one motion control parameter of the set of motion control parameters which controls motion of the utility vehicle from an initial value to an updated value which is different from the initial value.

Yet another embodiment is directed to a utility vehicle which includes a battery management system (BMS) having a lithium battery, a utility vehicle propulsion system constructed and arranged to provide utility vehicle propulsion using electric power from the lithium battery, and electronic circuitry coupled with the BMS and the utility vehicle propulsion system. The electronic circuitry us constructed and arranged to perform a method of:

(A) setting, within the utility vehicle propulsion system, a set of motion control parameters which controls motion of the utility vehicle to a set of initial values, (B) receiving stability control inputs which include a geolocation signal identifying a current location of the utility vehicle and a set of motion signals identifying a set of current motion characteristics of the utility vehicle, and (C) based on the geolocation signal and the set of motion signals, changing, within the utility vehicle propulsion system, at least one motion control parameter of the set of motion control parameters which controls motion of the utility vehicle from an initial value to an updated value which is different from the initial value.

In some arrangements, the utility vehicle includes global positioning system (GPS) circuitry constructed and arranged to provide the geolocation signal. Additionally, changing the at least one motion control parameter includes:

(i) acquiring a GPS coordinate from the geolocation signal, the GPS coordinate identifying the current location of the utility vehicle, and (ii) performing a geofence detection operation based on the GPS coordinate, a result of the geofence detection operation indicating that the utility vehicle is currently within a stability control geofence.

In some arrangements, the utility vehicle further includes a set of sensors constructed and arranged to provide the set of motion signals. Additionally, changing the at least one motion control parameter further includes:

(i) acquiring a set of motion metrics from the set of motion signals, the set of motion metrics identifying the set of current motion characteristics of the utility vehicle, and (ii) performing a stability assessment operation based on the set of motion metrics, a result of the stability assessment operation indicating that the utility vehicle is currently experiencing a reduced stability event.

In some arrangements, changing the at least one motion control parameter further includes performing an adjustment operation that adjusts a particular motion control parameter of the set of motion control parameters in response to the result of the geofence detection operation indicating that the utility vehicle is currently within a stability control geofence and the result of the stability assessment operation indicating that the utility vehicle is currently experiencing the reduced stability event.

In some arrangements, the utility vehicle includes an electric traction motor constructed and arranged to provide utility vehicle propulsion and motor control circuitry constructed and arranged to control the electric traction motor. Additionally, performing the adjustment operation that adjusts the particular motion control parameter includes reducing a speed limit imposed by the motor control circuitry on the electric traction motor while the utility vehicle is currently within the stability control geofence and while the utility vehicle is currently experiencing the reduced stability event.

In some arrangements, performing the stability assessment operation includes, while the utility vehicle is within the stability control geofence, generating an assessment signal indicating that the utility vehicle is currently experiencing adverse angular movement about at least one axis.

In some arrangements, the set of sensors includes an inertial measurement unit (IMU) constructed and arranged to provide a set of angular motion metrics. Additionally, generating the assessment signal includes detecting that the utility vehicle is currently experiencing angular movement intensity which exceeds an angular movement intensity threshold based on the set of angular motion metrics.

In some arrangements, the set of sensors includes a steering wheel sensor constructed and arranged to provide a steering wheel rotation measurement. Additionally, generating the assessment signal includes detecting that a steering wheel of the utility vehicle is currently rotated by at least a predefined amount based on the steering wheel rotation measurement.

In some arrangements, the set of sensors includes a set of tire (or wheel) speed sensors constructed and arranged to provide a set of tire speed measurements. Additionally, generating the assessment signal includes detecting that the utility vehicle is currently moving adversely by at least a predefined amount based on the set of tire speed measurements.

Along these lines, certain specialized circuitry of the utility vehicle may detect sharp cornering by looking at a difference in tire speeds (e.g., a tire speed delta between one or more outside wheels and one or more inside wheels of the utility vehicle during a turn). If the difference exceeds a predefined threshold during high tire rpms, the specialized circuitry may consider the utility vehicle to have encountered a reduced stability event.

In some arrangements, the set of motion metrics includes a first angular speed metric for utility vehicle angular speed about a vertical axis of the utility vehicle and a second angular speed metric for utility vehicle angular speed about a longitudinal axis of the utility vehicle. Additionally, performing the stability assessment operation based on the set of motion metrics includes generating, as at least a portion of the result of the stability assessment operation, a derived angular speed metric based on at least one of the first angular speed metric and the second angular speed metric.

Moreover, such metrics enable the utility vehicle to discern a severe cornering event based on angular acceleration, roll, etc. Other metrics are suitable for use as well such as pitch, yaw, and so on.

In some arrangements, changing the at least one motion control parameter further includes:

(i) comparing the derived angular speed metric to a predefined threshold, and (ii) lowering a particular motion control parameter from the initial value to the updated value in response to the derived angular speed metric exceeding the predefined threshold.

In some arrangements, the method further includes, while the utility vehicle is within the stability control geofence and prior to changing the at least one motion control parameter of the set of motion control parameters:

(i) acquiring an earlier set of motion metrics from the set of motion signals, the earlier set of motion metrics identifying an earlier set of current motion characteristics of the utility vehicle, (ii) performing an earlier stability assessment operation based on the earlier set of motion metrics, a result of the earlier stability assessment operation indicating that the utility vehicle is currently not experiencing a reduced stability event, and (iii) maintaining the at least one motion control parameter of the set of motion control parameters at the initial value in response to the result of the earlier stability assessment operation indicating that the utility vehicle is currently not experiencing a reduced stability event.

In some arrangements, the earlier set of motion metrics indicates that the utility vehicle is currently experiencing angular movement intensity which is below an angular movement intensity threshold. Additionally, the set of motion metrics indicates that the utility vehicle is currently experiencing angular movement intensity which is above the angular movement intensity threshold.

In some arrangements, the method further includes, after the at least one motion control parameter of the set of motion control parameters has been changed from the initial value to the updated value and after the utility vehicle has left the stability control geofence, performing a reset operation that resets the at least one motion control parameter of the set of motion control parameters from the updated value back to the initial value.

In some arrangements, the method further includes:

(i) performing a second geofence detection operation based on a second GPS coordinate, a result of the second geofence detection operation indicating that the utility vehicle has re-entered the stability control geofence, (ii) acquiring a new set of motion metrics from the set of motion signals, the new set of motion metrics identifying a new set of current motion characteristics of the utility vehicle, (iii) performing a new stability assessment operation based on the new set of motion metrics, a result of the new stability assessment operation indicating that the utility vehicle is currently not experiencing a reduced stability event, and (iv) maintaining the at least one motion control parameter of the set of motion control parameters at the initial value in response to the result of the second geofence detection operation indicating that the utility vehicle has re-entered the stability control geofence and the result of the stability assessment operation indicating that the utility vehicle is currently not experiencing a reduced stability event.

Other embodiments are directed to systems, subsystems, apparatus, assemblies, and so on. Some embodiments are directed to various methods, componentry, platforms, crafts, etc. which are involved in controlling motion of vehicles based on current locations and current motion characteristics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling a vehicle based on the vehicle's current location and one or more current motion characteristics (e.g., vehicle pitch, angular velocity about a particular axis, steering wheel rotation, combinations thereof, etc.). Along these lines, the vehicle may operate within a geographical region which includes one or more stability control geofences. When the vehicle enters such a stability control geofence, the vehicle performs a stability assessment (e.g., an evaluation of current motion characteristics) and, if the stability assessment indicates that the vehicle has encountered a reduced stability event (e.g., sharp cornering behavior, a steep forward pitch, extensive steering wheel rotation, combinations thereof, etc.), the vehicle updates a set of motion control parameters which controls vehicle motion to improve vehicle stability. Example motion control parameters include the vehicle's speed limit, acceleration rate, deceleration rate, and the like. In some arrangements, the amount of the limiting adjustment(s) is/are based on the intensity of the reduced stability event. With the vehicle being configured to change the value of one or more motion control parameters in such a situation, the vehicle may enjoy less restrictive motion control in other situations for convenience (e.g., when traveling outside of any stability control geofence, when traveling within a stability control geofence without encountering any reduced stability event, etc.).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
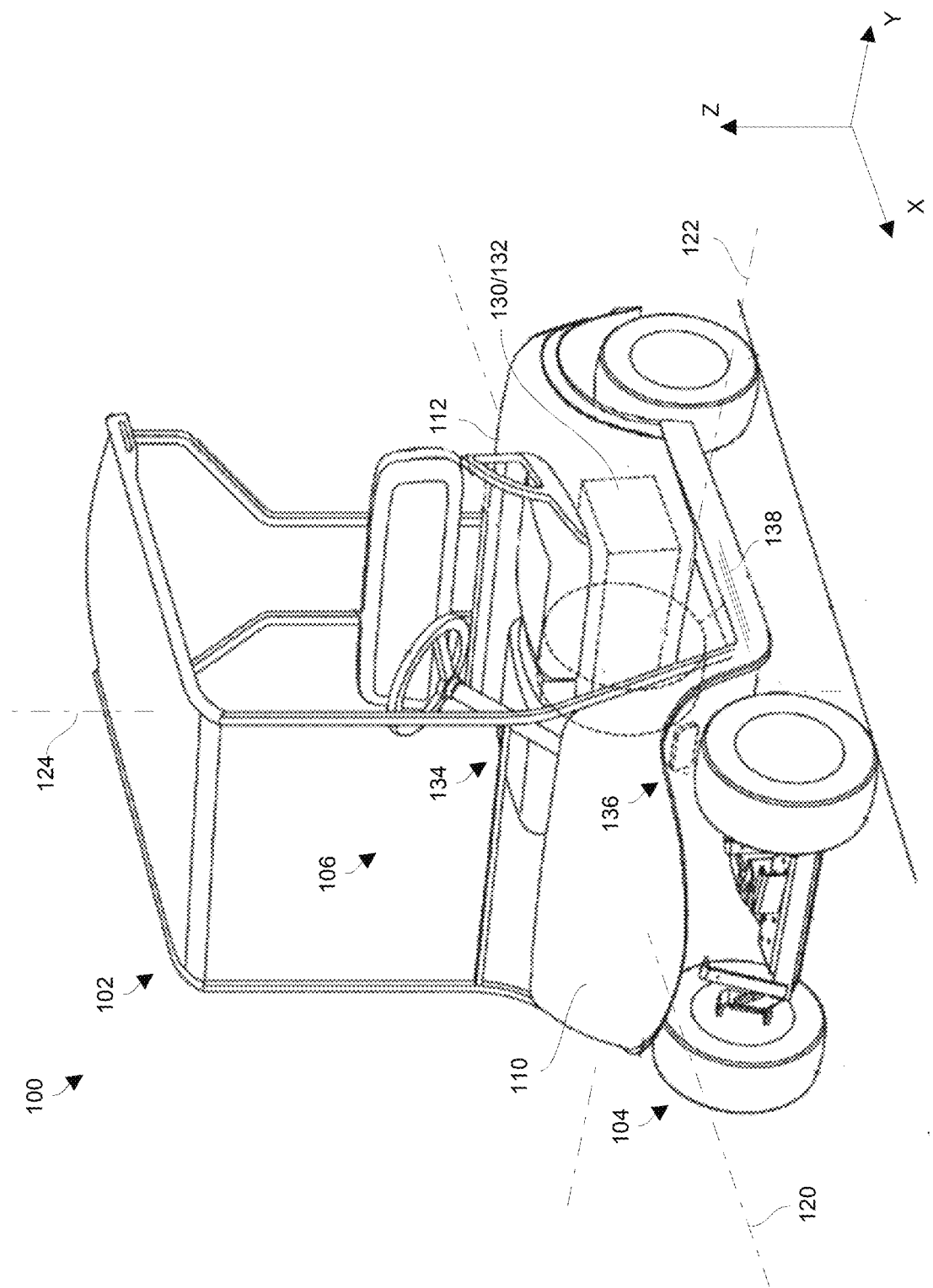
FIG. 1 is a diagram of an example vehicle which provides grade-based motion limiting in accordance with certain embodiments.

FIG. 1 shows an example utility vehicle 100 which provides motion control based on location and one or more current vehicle motion characteristics in accordance with certain embodiments. The utility vehicle 100 includes a utility vehicle body 102 (e.g., a chassis, a frame, etc.), a set of engagement members 104 (e.g., a set of tires), and a motion control system 106. It should be understood that the utility vehicle 100 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, skimobiles, as well as other lightweight and/or special purpose vehicles.

The utility vehicle body 102 defines a vehicle front 110 and a vehicle back 112. Accordingly, when the utility vehicle 100 moves forward in the direction of the utility vehicle's longitudinal axis 120, the utility vehicle 100 is considered to move in a front-to-back direction (e.g., see the positive X-direction in FIG. 1). It should be understood that the utility vehicle 100 still may be considered moving forward even if the utility vehicle 100 is additionally moving about the utility vehicle's lateral axis 122 (e.g., see the Y-axis in FIG. 1). Likewise, the utility vehicle 100 still may be considered moving forward even if the operator is also turning the steering wheel so that the utility vehicle 100 is additionally moving about the utility vehicle's vertical axis 124 (e.g., see the Z-axis in FIG. 1).

The set of engagement members 104 is constructed and arranged to interact with the environment to move the utility vehicle 100. It should be understood that various types of engagement members 104 are suitable for use (e.g., tires/wheels, tracks, rails, combinations thereof, etc.) depending on the type of environment or terrain (e.g., a road, dirt, brush, snow, ice, marsh, etc.).

The motion control system 106 is constructed and arranged to control vehicle movement such as drive provided by the set of engagement members 104, speed control, braking, and so on thus enabling the utility vehicle 100 to effectively maneuver and perform useful work. The motion control system 106 may include, among other things, a motor system 130, a battery management system 132, and additional components 134 such as a set of user controls 136 (e.g., foot pedals, transmission control, a keyed switch, a maintenance switch, additional levers/knobs/etc.), cabling 138, and so on.

It should be understood that certain components of the motor control system 106 (or portions thereof) may be disposed within a set of compartments (in one or more compartments) under a set of seats (under one or more seats) of the utility vehicle 100. For example, a compartment underneath a seat of the utility vehicle 100 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 106 includes other apparatus/components as well. Along these lines, the motion control system 106 further includes a drivetrain (e.g., a set of gears, linkage, differential, etc.) that connects the motor system 130 to the set of engagement members 104 (e.g., two drive wheels and two non-drive wheels, four drive wheels, tracks, etc.), a steering wheel (or column), a steering gear set that connects the steering wheel to certain engagement members 104, a set of brakes, other controls and sensors, and so on.

As will be explained in further detail shortly and in accordance with certain embodiments, the utility vehicle 100 includes an electric traction motor which runs on electric power from a rechargeable battery for propulsion, and which may be equipped with a regenerative braking control feature which recharges the rechargeable battery. Moreover, the utility vehicle 100 is configured to operate in accordance with a set of maximum motion limits (e.g., to improve the user experience, to protect equipment of the utility vehicle 100, to protect passengers and/or bystanders, combinations thereof, etc.). Such a set of maximum motion limits or constraints (e.g., a maximum speed, a maximum acceleration rate, a maximum deceleration rate, combinations thereof, etc.) are the highest motion limits permitted/allowed by the motion control system 106 during operation of the utility vehicle 100.

During operation, the utility vehicle 100 is configured to automatically select, in real-time, particular maximum motion limits based on a current location of the utility vehicle 100 and a set of current vehicle motion characteristics of the utility vehicle 100. Along these lines, if the utility vehicle 100 is not within a stability control geofence, the utility vehicle 100 may select and use an initial (or default) set of values for a set of motion control parameters (e.g., an initial speed limit, an initial maximum acceleration rate, an initial maximum deceleration rate, and so on).

However, if the utility vehicle 100 is within a stability control geofence, the utility vehicle 100 may adjust one or more maximum motion limits of the set of maximum motion limits depending on how the utility vehicle 100 is currently moving. That is, if the utility vehicle 100 enters the stability control geofence but is moving forward in a straight line without any angular velocity, the utility vehicle 100 may leave the set of maximum motion limits unadjusted (i.e., as is). On the other hand, if the utility vehicle 100 is within the stability control geofence and is moving forward but not in a straight line, the utility vehicle 100 may lower one or more maximum motion limits of the set of maximum motion limits to improve vehicle stability and/or enhance the user experience.

For example, suppose that the utility vehicle 100 is a golf cart which is equipped with a GPS device that utilizes geofence detection to maintain the golf cart on a cart path. Further suppose that the utility vehicle 100 enters a stability control geofence (i.e., a geofence which is specifically identified for motion control). When the utility vehicle 100 enters the stability control geofence, specialized circuitry within the utility vehicle 100 may obtain a set of motion signals identifying a set of current motion characteristics of the utility vehicle 100 such as a current amount of pitch, a current amount of roll, a current amount cornering, a current amount of steering wheel rotation, one or more tire speeds, and so on. From these motion characteristics, the specialized circuitry can determine whether the utility vehicle 100 is traveling in a stable manner, or whether the utility vehicle 100 is currently experiencing a reduced stability event.

If the utility vehicle is traveling in a stable manner (e.g., forward in a straight line within any angular velocity), the specialized circuitry leaves the set of maximum motion limits unchanged (e.g., the utility vehicle 100 continues to operate using the initial or default values for the maximum motion limits). However, if the utility vehicle is currently experiencing a reduced stability event (e.g., the utility vehicle 100 is attempting to turn with a certain amount of roll), the specialized circuitry dynamically changes one or more of the maximum motion limits to improve vehicle stability (e.g., the utility vehicle 100 reduces the speed limit causing the utility vehicle 100 to slow down if the utility vehicle 100 is traveling faster than the reduced speed limit). In accordance with certain embodiments, the amount of one or more limiting adjustments is based on the intensity of the reduced stability event. Such improved vehicle stability not only improves the user experience but also prevents undesirable incidents from occurring.

It should be appreciated that a variety of motion metrics are suitable for use. Such motion metrics include roll, pitch, yaw, combinations thereof, and so on. Moreover, certain units such as rate, acceleration, etc. may be combined, scaled, normalized, derived, and so on.

At this point, the utility vehicle 100 may return to using the initial/default values for the maximum motion limits. Suitable times to return to using the initial/default values include when the utility vehicle 100 exits the stability control geofence, when a predefined amount of time has passed after the reduced stability event has ended, when the sensed motion for the utility vehicle 100 drops to a certain level or threshold, combinations thereof, etc.

In some arrangements in which the utility vehicle 100 is capable of performing regenerative braking, the utility vehicle 100 may impose different deceleration rates depending on how intensely the utility vehicle 100 is turning. Further details will now be provided with reference to FIGS. 2 through 4.

Figure 2:
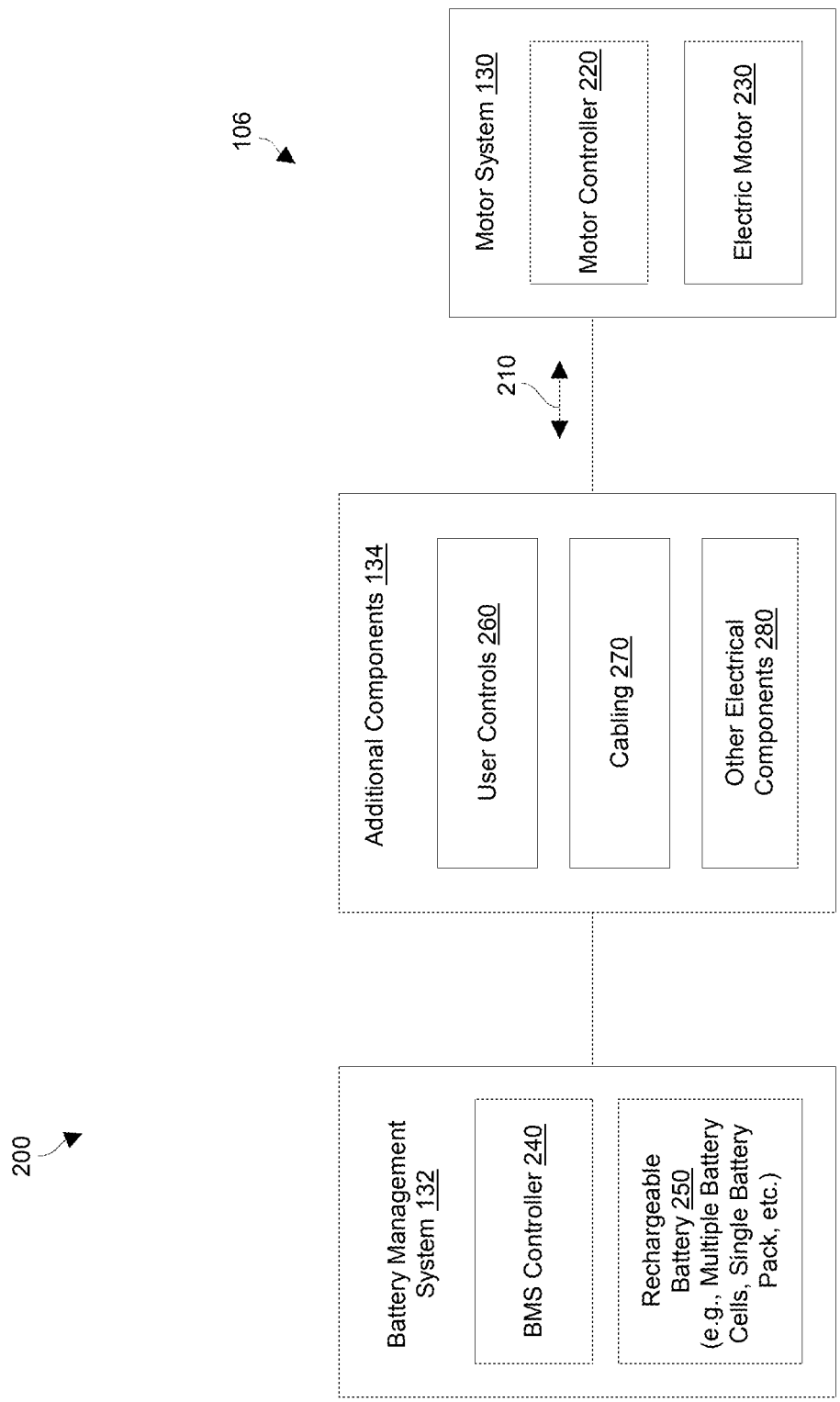
FIG. 2 is a block diagram of a portion of the example vehicle in accordance with certain embodiments.
Figure 3:
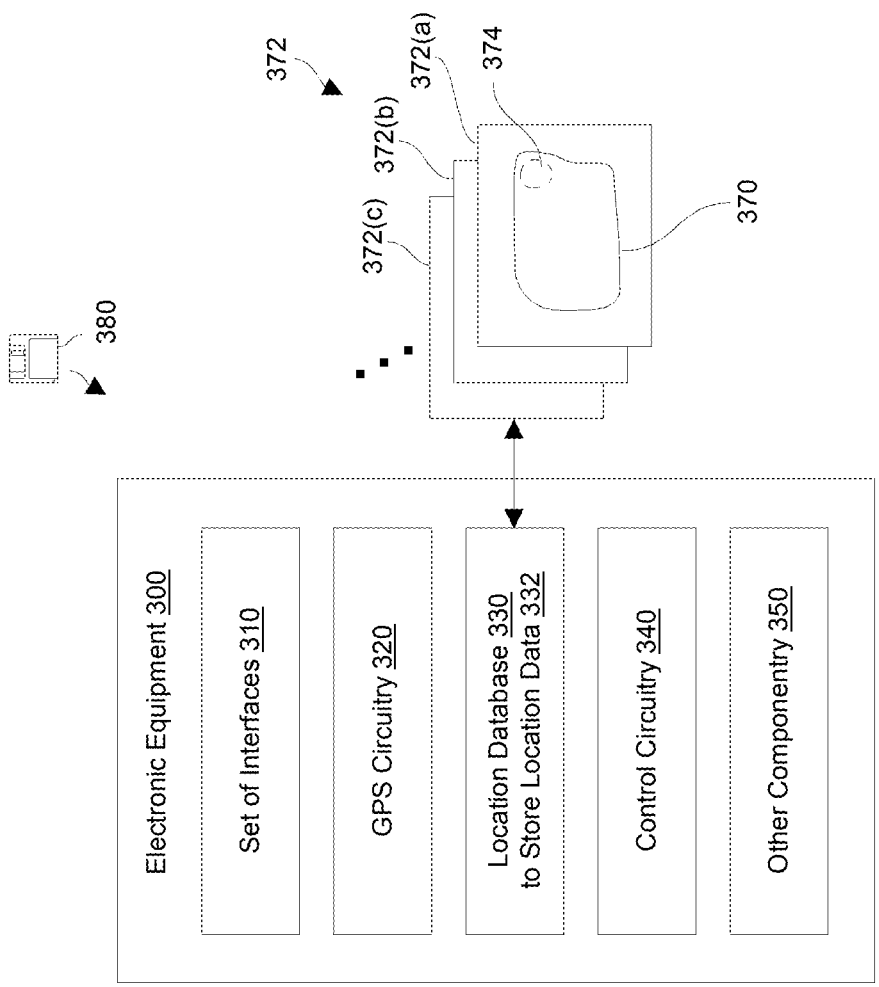
FIG. 3 is another block diagram of a portion of the example vehicle in accordance with certain embodiments.
Figure 4:
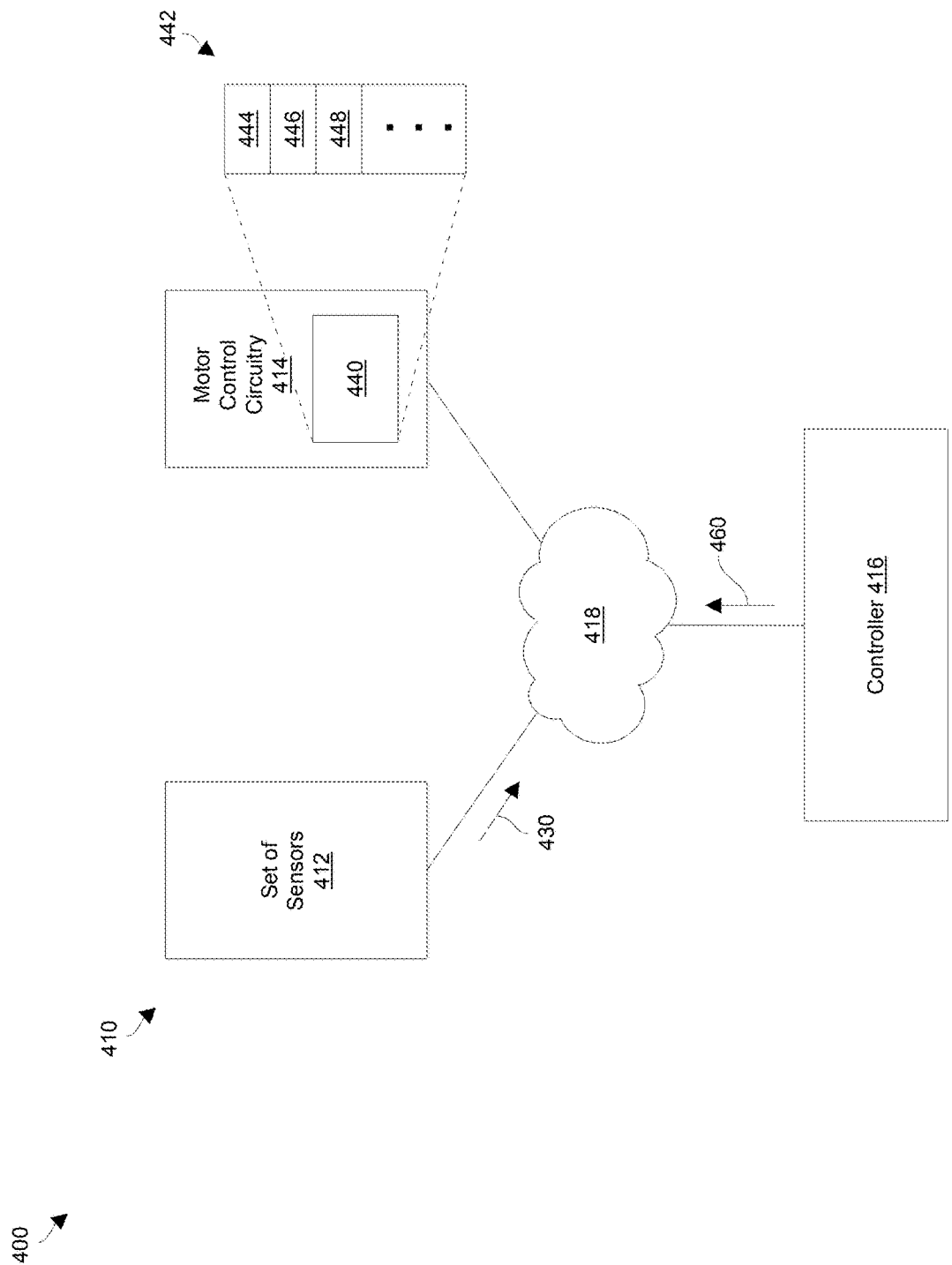
FIG. 4 is yet another block diagram of a portion of the example vehicle in accordance with certain embodiments.

FIGS. 2 through 4 provide certain details regarding vehicle motion control based on current location and one or more current vehicle motion characteristics in accordance with certain embodiments. FIG. 2 is a view 200 of at least a portion of the motion control system 106 of the utility vehicle 100 (also see FIG. 1) in accordance with certain embodiments. FIG. 3 is a view 300 of certain equipment of the motion control system 106 which is involved in detecting when the utility vehicle 100 is currently within a stability control geofence in accordance with certain embodiments. FIG. 4 is a view 400 of certain components of the motion control system 106 which are involved in vehicle motion control based on current location and a set of (i.e., one or more) current vehicle motion characteristics in accordance with certain embodiments.

As shown in the view 200 of FIG. 2, the motor system 130, the battery management system (BMS) 132, and the additional components 134 are coupled with each other (e.g., via power buses, communications buses, etc.) and exchange electrical signals 210 (e.g., power signals, control/status signals, sensor signals, and so on). The motor system 130 includes a motor controller 220 and an electric traction motor 230 (or simply electric motor 230) coupled with the motor controller 220. The BMS 132 includes a BMS controller 240 and a rechargeable battery 250 coupled with the BMS controller 240. The additional components 134 refer to various componentry coupled with the motor system 130 and/or the battery management system 132 such as user controls 260 (e.g., switches, pedals, etc.), cabling 270 (e.g., power cables, communications buses, etc.), and other electrical components 280 (e.g., a charging receptacle and/or an onboard charger, a global positioning system device, sensors, lights, specialized equipment, other loads, etc.). In some arrangements, various components of the motion control system 106 communicate through a controller area network (CAN) bus via electronic CAN messages in accordance with the CAN protocol.

The motor controller 220 of the motor system 130 is constructed and arranged to control delivery of stored electric energy from the BMS 132 to the electric motor 230 which ultimately operates at least some of the engagement members 124 to move the utility vehicle 100. Additionally, the motor controller 220 may operate the electric motor 230 to provide regenerative braking in which the electric motor 230 converts kinetic energy of the moving utility vehicle 100 into electrical energy to recharge the rechargeable battery 250 (e.g., during braking, while the utility vehicle 20 coasts downhill, during accelerator pedal release, etc.). To this end, the motor controller 220 and/or the additional components 134 may be provisioned with a battery system interface that enables the motor controller 220 to robustly and reliably connect with and communicate with the BMS 132.

In accordance with certain embodiments, the electric motor 230 is a three-phase induction motor which includes a stator having three-phase windings, and a rotor connected to one or more engagement members 104 (also see FIG. 1). The motor controller 220 operates the electric motor 230 by providing a three-phase AC current through the stator to produce a rotating magnetic field which rotates the rotor either in the forward or reverse direction. The motor controller 220 controls the rate of rotation and strength by controlling the frequency and amplitude of the AC current.

The BMS controller 240 of the BMS 132 is constructed and arranged to control electrical access to the rechargeable battery 250. Additionally, the BMS 132 may respond to various events such as sleep events (e.g., timeouts) to prevent excessive discharging of the rechargeable battery 250, overvoltage events to prevent creating an overvoltage situation, etc. thus safeguarding the rechargeable battery 250. The BMS controller 240 may respond to other events as well such as wakeup events (e.g., actuation of the user controls 136, etc.), charging events, faults, and so on to properly and safely control charging and discharging of the rechargeable battery 250.

It should be understood that a variety of battery types and form factors are suitable for the rechargeable battery 250. For example, the rechargeable battery 250 may be a lithium battery which includes multiple lithium battery cells, a single battery pack, combinations thereof, and so on. As another example, the rechargeable battery 250 may utilize one or more lead acid batteries in place of, or in combination with, the lithium battery, and so on. In some multi cell arrangements, the BMS controller 240 monitors various individual metrics from each cell (e.g., state of charge, voltage, temperature, etc.) and is constructed and arranged to provide such individual metrics and/or aggregated metrics (e.g., the highest voltage among the cells, the lowest voltage among the cells, the highest temperature among the cells, the lowest temperature among the cells, averaged and/or median values, etc.) to the motor system 130 (e.g., periodically, in response to commands, combinations thereof, etc.).

In accordance with some embodiments, the BMS controller 240 includes a BMS contactor and a BMS control circuit that closes the BMS contactor in order to connect the rechargeable battery 250 to the motor system 130. If the BMS control circuit detects certain events and/or faults, the BMS control circuit opens the BMS contactor to disconnect the rechargeable battery 250 from the motor system 130. For example, if there is too much regenerative braking charge supplied by the motor system 130 while the rechargeable battery 250 is almost fully charged, the BMS control circuit may open the BMS contactor to avoid an overvoltage situation. Such operation safeguards the rechargeable battery 250.

It should be understood that one or more portions of the BMS controller 240 may reside along with the rechargeable battery 250 within a standalone battery package or module. For example, certain sensors and fault detection circuitry may reside in such a battery package.

Furthermore, one or more portions of the BMS controller 240 may reside outside such a battery package or module. For example, a contactor and/or sleep logic may be external to such a battery package.

The user controls 260 of the additional components 134 are constructed and arranged to enable an operator to control operation of the utility vehicle 100 (FIG. 1). Along these lines, the user controls 260 may include an accelerator pedal to enable an operator to control the speed, etc. of the electric motor 230 and thus the speed, etc. of the utility vehicle 100. Additionally, the user controls 260 may include a brake pedal to enable the operator to provide braking (e.g., regenerative braking, deployment of a mechanical service brake if available, engagement of an emergency or parking brake if fully depressed, etc.). Furthermore, the user controls 260 may include a transmission switch to control whether the motor system 130 moves the utility vehicle 100 in the forward (or front-to-back) direction or reverse (or back-to-front) direction in response to pedal depression. Other user controls 260 include a keyed switch, a tow switch, and so on.

In some arrangements, speed control which is based on the amount of accelerator pedal deflection (or depression) involves Hall sensing or inductive throttles. However, other mechanisms are suitable for use as well such as measuring accelerator pedal deflection using a potentiometer or similar device, accessing a mapping table which maps (or converts) a signal from the potentiometer to particular speeds, etc.

The other electrical components 280 refers to other systems, subsystems, etc. of the utility vehicle 100. In some arrangements, the utility vehicle 100 is provisioned with GPS circuitry (e.g., a GPS device) to identify a current GPS location of the utility vehicle 100. Such GPS circuitry may enable the utility vehicle 100 to impose geofencing-based vehicle control, report vehicle location to a central server, access other services (e.g., weather forecasts, local maps, golf course information/distances, etc.).

During operation, the operator may use the utility vehicle 100 to perform useful work. Generally, the utility vehicle 100 may traverse various regions which include one or more stability control geofences that the utility vehicle 100 may enter into and exit from at various times. For example, in the context of a golf cart, the operator may drive the utility vehicle 100 over various surfaces and/or contours while utility vehicle 100 carries one or more sets of golf clubs to maneuver among holes of a golf course. Along these lines, the golf course may include mild terrain such as wide and straight cart paths, relatively flat fairways, wide and flat bridges, etc. which enable driving the utility vehicle 100 in a generally straight path and with high stability. Such terrain may further include more aggressive terrain such as winding cart paths, rolling fairways, arching bridges, steep hills, other hazards, etc. which require making sharp turns, which cause the utility vehicle 100 to lean, and so on.

As mentioned earlier, other uses exist for the utility vehicle 100 (e.g., personnel and/or cargo transport, catering, emergency applications, off-road applications, specialized applications, etc.). For such other uses, the environment may be similar to and/or different from golf course terrain.

During utility vehicle operation, the motor controller 220 of the utility vehicle 100 imposes motion control over the electric motor 230 in accordance with various maximum motion limits (e.g., a speed limit, a maximum acceleration rate, a maximum deceleration rate, etc.). When the utility vehicle 100 enters a stability control geofence, the utility vehicle 100 may change the values of these maximum motion limits (or constraints) for an improved user experience, for a safer ride, combinations thereof, etc.

Along these lines, at startup, the maximum motion limits are set to initial values. Such initial values may be stored within the motor controller 220 persistently, loaded into the motor controller 220 at startup, commanded to the motor controller 220 in an ongoing manner, etc. For example, the speed limit imposed by the motor controller 220 in the forward direction may be 18 mph (miles per hour), the maximum acceleration rate may be 50 deg/sec (degrees per second), and so on. Other motion metrics, parameters, etc. are suitable for use as well.

After the maximum motion limits are set to initial values, specialized circuitry may change the maximum motion limits based on current location and current vehicle motion characteristics. Along these lines, the specialized circuitry monitors the current location of the utility vehicle 100 and the current vehicle motion characteristics in an ongoing manner, and may adjust one or more maximum motion limits when the current location and the current vehicle motion characteristics satisfy certain criteria.

For example, if utility vehicle 100 has entered a stability control geofence and the current vehicle motion characteristics indicate a significant (or severe) turning event, the specialized circuitry may reduce the speed limit imposed by the motor controller 220 from 18 mph to 15 mph and/or the maximum acceleration rate from 0.3 g's to 0.1 g's. Again, other values and/or units are suitable for use as well (e.g., seconds, meters/second, G's or g-force, and so on).

In accordance with certain embodiments, while the utility vehicle 100 is within the stability control geofence, the utility vehicle 100 continuously monitors one or more current motion characteristics to determine whether to reduce one or more maximum motion limits. Along these lines, suppose that the utility vehicle 100 enters a sharp turn (or intense sway) while driving within the stability control geofence. In such a situation, the specialized circuitry ascertains the severity of the turn. If the specialized circuitry determines that the severity of the turn does not satisfy a predefined set of criteria, the specialized circuitry does not adjust any of the initial values of the maximum motion limits. However, if the specialized circuitry determines that the severity of the turn satisfies the predefined set of criteria while the utility vehicle 100 currently resides within a stability control geofence, the specialized circuitry adjusts at least one initial value to a new value as will be explained in further detail shortly.

As shown in FIG. 3, certain electronic equipment 300 is involved in detecting when the utility vehicle 100 is currently within a stability control geofence in accordance with certain embodiments. The electronic equipment 300 includes a set of interfaces 310, GPS circuitry 320, a location database 330 to store location data 332, control circuitry 340, and other componentry 350.

The set of interfaces 310 enables the electronic equipment 300 to communicate with other components of the motion control system 106 of the utility vehicle 100 (also see FIG. 2). Along these lines, the set of interfaces 310 may include one or more network interfaces (e.g., a network card, a wireless transceiver, etc.) to enable the electronic equipment 300 to communicate with other equipment/devices/etc. of the motion control system 106 (also see FIG. 2). Alternatively, or additionally, the set of interfaces 310 may include other types of interfaces such as specialized or custom circuitry to interface with specialized equipment (e.g., a wireless interface to connect with an external base station or to provide cellular connectivity, a power port to connect with an external charger, a CAN bus interface, combinations thereof, etc.).

The GPS circuitry 320 is constructed and arrange to identify a current GPS location (e.g., GPS coordinates) of the electronic equipment 300. Accordingly, when the electronic equipment 300 is installed as part of the motion control system 106 of the utility vehicle 100, the GPS circuitry 320 is able to identify the current GPS location of the utility vehicle 100.

The location database 330 is constructed and arranged to store location data 332 for one or more geographic regions 370 traversable by the utility vehicle 100 (e.g., a campus, a gated community or village, a golf course, other mapped regions, combinations thereof, etc.). Along these lines, the location data 332 may include a set of geofencing entries 372(a), 372(b), 372(c), . . . (collectively, geofencing entries 372). The geofencing entries 372 define respective geofences 374, i.e., geographic areas within the geographic region 370 which are defined by virtual boundaries or perimeters within which the utility vehicle 100 may reside from time to time.

It should be understood that the geofencing entries 372 for the geofences 374 may define grids (or arrays of cells/coordinates) of adjacent GPS locations. Here, at least some of the GPS locations within the grids are marked as belonging to the geofences 374 (i.e., as being inside the geofences 374), and other GPS locations are marked as not belonging to the geofences 374 (i.e., as being outside the geofences 374).

It should be further understood that when the GPS circuitry 320 identifies the current GPS location of the utility vehicle 100, the current GPS location may be compared to the geofencing entries 372 to determine whether the utility vehicle 100 currently resides within any of the geofences 374. That is, when the utility vehicle 100 moves into a GPS location that is marked as belonging to the geofence 374, the utility vehicle 100 may be considered as being in (or having entered) the geofence 374. If the utility vehicle 100 moves into another GPS location that is marked as belonging to the geofence 374, the utility vehicle is considered to still reside in the geofence 374. However, when the utility vehicle 100 moves out of that GPS location and into a GPS location that marked as not belonging to the geofence 374, the utility vehicle 100 is considered as no longer being in (or having exited) the geofence 374.

At this point, it should be understood that the geofencing entries 372 may define the geofences 374 as being of different types such as stability control type or regular (i.e., non-stability control) type geofences 374. If the utility vehicle 100 is within a stability control geofence 374, the motion control system 106 of the utility vehicle 100 may adjust one or more maximum motion limits of the set of maximum motion limits depending on how the utility vehicle 100 is currently moving. However, if the utility vehicle 100 is not within a stability control geofence 374 (e.g., the utility vehicle 100 could still be within a regular geofence 374), the motion control system 106 of the utility vehicle 100 simply uses the default maximum motion limits (e.g., the set of initial values).

It should be understood that geofencing was described above as leveraging GPS by way of example only and that other geofencing technologies are suitable for use as well. For example, in other embodiments, the geofences 374 may be associated with or defined by Bluetooth beaconing, RF readers, combinations thereof, and so on.

The control circuitry 340 of the electronic equipment 300 is constructed and arranged to perform one or more operations involved in detecting when the electronic equipment 300 is within a stability control geofence 374 and outputting an appropriate result signal. Such operation may include identifying a current location of the utility vehicle 100 and comparing the current location to the location data 332 of the location database 330. If the control circuitry 340 determines that the utility vehicle 100 currently resides within a stability control geofence 374, the control circuitry 340 outputs a result signal indicating this detail. Furthermore, such operation may include communicating with other circuitry such as the motor controller 220 of the motor system 130, specialized circuitry that provides commands to the motor controller 220, combinations thereof, and so on.

In some arrangements, in addition to providing a result signal indicating whether the utility vehicle 100 is currently within a stability control geofence 374, the control circuitry 340 may perform other operations. Along these lines, the control circuitry 340 may provide new maximum motion limit values based on which stability control geofence the utility vehicle 100 has entered, may provide result signals indicating whether the utility vehicle 100 has entered non stability control geofences 374, and so on.

It should be appreciated that the control circuitry 340 may be implemented in a variety of ways such as via one or more processors (or cores) running specialized software stored in non-volatile memory, application specific ICs (ASICs), field programmable gate arrays (FPGAs) and associated programs, discrete components, analog circuits, other hardware circuitry, combinations thereof, and so on. In the context of one or more processors (and/or other types of computerized circuitry) executing software, a computer program product 380 is capable of delivering all or portions of the specialized software to the electronic equipment 300. In particular, the computer program product 380 includes a non-transitory (or non-volatile) computer readable medium which stores a set of instructions that controls one or more operations of the electronic equipment 300. Examples of suitable computer readable storage media include tangible articles of manufacture and apparatus which store instructions in a non-volatile manner such as DVD, CD ROM, flash memory, disk memory, tape memory, combinations thereof, and the like.

The other componentry 350 of the electronic equipment 300 refers to additional features/components that may belong to the electronic equipment 300. Along these lines, the electronic equipment 300 may have a local set of user input/output (I/O) devices (e.g., a touchscreen or similar display, a keyboard, a mouse, a microphone, LEDs, a speaker, etc.), and so on.

In some arrangements, the electronic equipment 300 is provided as a modular device which couples with the other components of the motion control system 106 (e.g., by connecting to a CAN bus of the utility vehicle 100). Accordingly, legacy utility vehicles may be conveniently upgraded without extensive modifications, redesigns, and so on.

In other arrangements, the electronic equipment 300 is more tightly integrated with the other components of the motion control system 106 (e.g., by sharing certain resources such as the same housing/enclosure and/or circuits as that of the motor controller 220, by residing on the same circuit board as other processing circuitry of the utility vehicle 100, etc.). Accordingly, new utility vehicles may share infrastructure to reduce/eliminate redundancy, waste, etc.

In some arrangements, the electronic equipment 300 is constructed and arranged to perform a variety of other operations. Such operations may include outputting alerts when the utility vehicle 100 is in a restricted or hazardous area, providing weather information, communicating with a base station, and so on. In the context of a specialized vehicle such as a golf cart, the electronic equipment 300 may display, based on current GPS locations, current golf holes, entire hole distances, distances from the utility vehicle 100 to the pins, pace of play, etc.

As shown in the view 400 of FIG. 4, certain electronic circuitry 410 of the motor system 130 is involved in motion control based on one or more current vehicle motion characteristics. The electronic circuitry 410 includes a set of sensors 412, motor control circuitry 414, a controller 416, and a communications medium 418. The set of sensors 412 is constructed and arranged to sense various current motion attributes of the utility vehicle 100. Example motion attributes that may be sensed and/or derived from other sensed motion attributes include roll about the utility vehicle's longitudinal axis 120, pitch about the utility vehicle's lateral axis 122, the utility vehicle's angular velocity about the utility vehicle's vertical axis 124, combinations thereof, etc. (also see FIG. 1). Suitable sensor components for the set of sensors 412 include accelerometers, gyroscopes, and the like. The set of sensors 412 measures and outputs a set of sensor signals 430 indicating certain motion-related attributes such as linear acceleration, pitch, roll, vibration, combinations thereof, etc. in one or more directions (e.g., one, two, or three directions).

In the alternative or additionally, the set of sensors 412 may include other types of sensors. For example, the set of sensors 412 may include a steering wheel sensor to detect a current amount of steering wheel rotation, axle or tire sensors to detect speed and/or skidding events, environmental sensors to detect wet vs. dry surface conditions, other vehicle motion related factors, combinations thereof, and so on. In this example, a difference between the speeds of one or more outside wheels and one or more inside wheels of the utility vehicle 100 during a turn may indicate a measure of stability. Along these lines, if the difference is greater than a predefined threshold and this excessive wheel-speed delta is present when the average wheel speed (or rpm) is indicating a high speed, this combination can be considered a reduced stability event.

In some embodiments, one or more sensors 412 are built-in to the motor controller 220 (also see FIG. 2). In some embodiments, one or more sensors 412 are external to the motor controller 220 (e.g., one or more discrete components). In some embodiments, a portion of the set of sensors 412 forms part of the motor controller 220, and another portion of the set of sensors 412 is external to the motor controller 220 (e.g., is within a GPS device, are standalone sensors, combinations thereof, etc.).

The motor control circuitry 414 is constructed and arranged to control operation of the electric motor 230 (also see FIG. 2). Along these lines, the motor control circuitry 414, which is part of the motor controller 220 (FIG. 2), monitors various inputs such as accelerator pedal depression (e.g., angular displacement of the accelerator pedal), the current direction setting (e.g., forward, reverse, and neutral), brake pedal depression, and so on. In response to such inputs, the motor control circuitry 414 operates the electric motor 230 by providing various motion responses (e.g., speed, acceleration, deceleration, etc.).

Additionally, in some embodiments, the motor control circuitry 414 includes memory 440 (e.g., a bank of control/status registers) which stores a set of operating parameters 442 such as a speed limit 444, a maximum acceleration rate 446, a maximum deceleration rate 448, and so on. The motor control circuitry 314 uses the set of operating parameters 442 as operating constraints and/or guidance and may control the rate of rotation of the electronic motor 230 in response thereto (e.g., via signal strength, based on timing, whether to perform regenerative braking, etc.) to smoothen vehicle behavior, provide safety, improve the user experience, etc. As will be explained in further detail shortly, one or more of the operating parameters 442 may be changed in real-time (e.g., set at startup, changed at time T0 during runtime, changed again at time T1 during runtime, and so on).

The controller 416 is constructed and arranged to provide a set of control signals 460 to the motor control circuitry 414. The set of control signals 460 determines how the motor control circuitry 414 operates the electric motor 230. In some arrangements, the controller 416 includes the electronic equipment 300 (also see FIG. 3). In other arrangements, the electronic equipment 300 is external to the controller 416.

Along these lines, the controller 416 may receive (i) a result signal indicating whether the utility vehicle 100 is within a stability control geofence and (ii) the set of sensor signals 430 from the set of sensors 412 and perform operations to determine whether to change any values of the set of operating parameters 442 used by the motor control circuitry 414. For example, the controller 416 may initially direct the motor control circuitry 414 to use an initial (or default) set of values for the set of operating parameters 442. Then, when the controller 416 detects that the utility vehicle 100 has entered a stability control geofence, the controller 416 may update one or more of the set of operating parameters 442 with new values based on various factors indicated by the set of sensor signals 430. The controller 416 may continue this operation in an ongoing manner (e.g., while the utility vehicle 100 is driven by an operator) thus achieving real-time vehicle motion control based on current vehicle motion characteristics.

The communications medium 418 is constructed and arranged to connect the various components of the electronic circuitry 410 together to enable these components to exchange electronic signals (e.g., see the arrows 430 and 460). The communications media 418 is illustrated as a cloud to indicate that the communications media 418 is capable of having a variety of different topologies including backbone, hub-and-spoke, loop, irregular, combinations thereof, and so on. Along these lines, the communications media 418 may include copper-based data communications devices and cabling, fiber optic devices and cabling, wireless devices for wireless communications, combinations thereof, etc. Furthermore, the communications media 418 is capable of using one or more buses, cables, individual conductors, circuit board traces, communications interfaces, shared resources, combinations thereof, etc.

It should be understood that, initially, the set of operating parameters 442 may have been pre-loaded into the motor control circuitry 414 by the controller 416 (e.g., when the utility vehicle 100 is turned on). Alternatively, the motor control circuitry 414 may persistently store the set of operating parameters 442 and thus have access to the set of operating parameters 442 at the onset of operation.

Then, in an ongoing manner, the controller 416 receives (i) the result signal indicating whether the utility vehicle 100 is within a stability control geofence and (ii) the set of sensor signals 430 from the set of sensors 412 through the communications medium 418 and performs operations to determine whether to change any of the set of operating parameters 442 used by the motor control circuitry 414. If the controller 416 determines, based on the result signal and the set of sensor signals 430, that the set of current physical attributes of the utility vehicle 100 fits a certain set of criteria, the controller 416 outputs the set of control signals 460 to the motor control circuitry 414 through the communications medium 418 to update one or more of the set of operating parameters 442.

Accordingly, the controller 416 adjusts a set of maximum motion limits in real time based on a current location and a set of current motion characteristics of the utility vehicle 100. The motor control circuitry 414 then imposes the adjusted set of maximum motion limits on the utility vehicle 100 while the utility vehicle 100 is being driven. Accordingly, such motion limiting adjustment is made by the electronic circuitry 400 automatically without requiring user intervention (e.g., the utility vehicle 100 may automatically slow down in a severe cornering event even if the operator does not let up on the accelerator pedal or even if the operator does not have time or appropriate coordination to properly react). Further details will now be provided with reference to FIG. 5.

Figure 5:
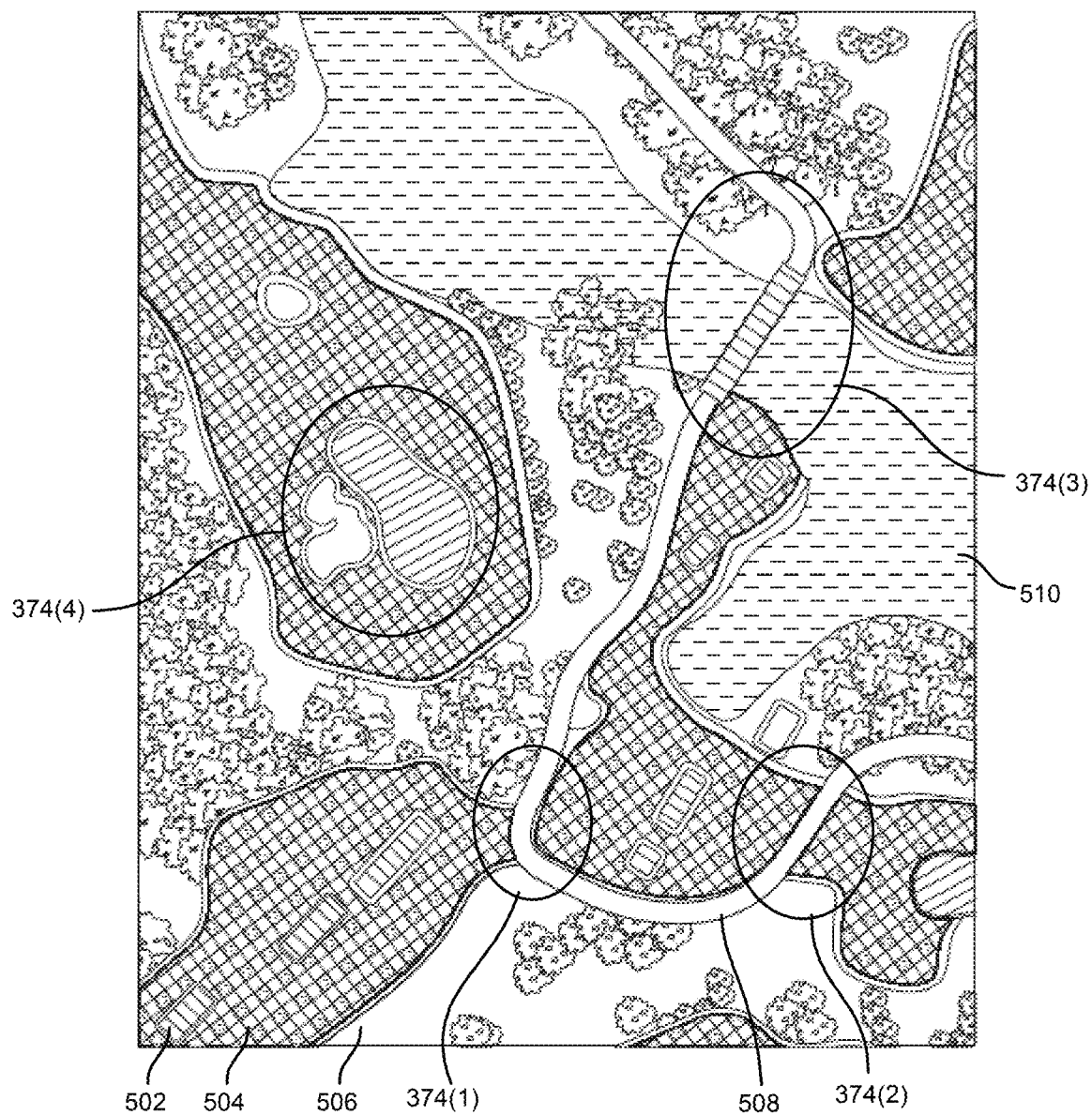
FIG. 5 is a diagram of a geographic region having stability control geofences in accordance with certain embodiments.

FIG. 5 shows an example geographic region 500 in accordance with certain embodiments. The example geographic region 500 is part of a golf course which includes tee boxes 502, fairways 504, rough areas 506, cart paths 508, water hazards 510, and so on.

Within the example geographic region 500, there are predefined geofences 374 some of which are stability control type. Furthermore, some of the predefined geofences 374 are regular (or non stability control) type.

Along these lines, the geofences 374(1), 374(2), and 374(3) are stability control type. Accordingly, if the utility vehicle 100 enters one of the stability-control geofences 374(1), 374(2), and 374(3), the utility vehicle 100 may adjust one or more motion control limits if the utility vehicle 100 detects a reduced stability event (e.g., measured and/or computed utility vehicle movement that exceeds a threshold). For example, the utility vehicle 100 may reduce its speed limit if the utility vehicle 100 operates within any of the stability control geofences 374(1), 374(2), and 374(3) at a steep pitch, with aggressive steering wheel rotation, under high angular velocity about its vertical axis, combinations thereof, etc. Such situations are considered to be reduced stability events which warrant greater stability control.

On the other hand, the geofence 374(4) is of the regular type. Accordingly, if the utility vehicle 100 enters the geofence 374(4), the utility vehicle 100 does not perform adjust any motion control limits if the utility vehicle 100 detects a reduced stability event. The regular or non stability control type geofence 374(4) may direct the utility vehicle 100 to perform other types of motion control operations (e.g., disable movement in the forward direction, send an alert to a central station or ranger, and so on).

It should be understood that other environments are suitable for the geographic region 500. For example, the geographic region 500 may be a park, a campus, a resort, a gated community, a factory or other industrial area, a warehouse, and so on. Further detail will now be provided with reference to FIG. 6.

Figure 6:
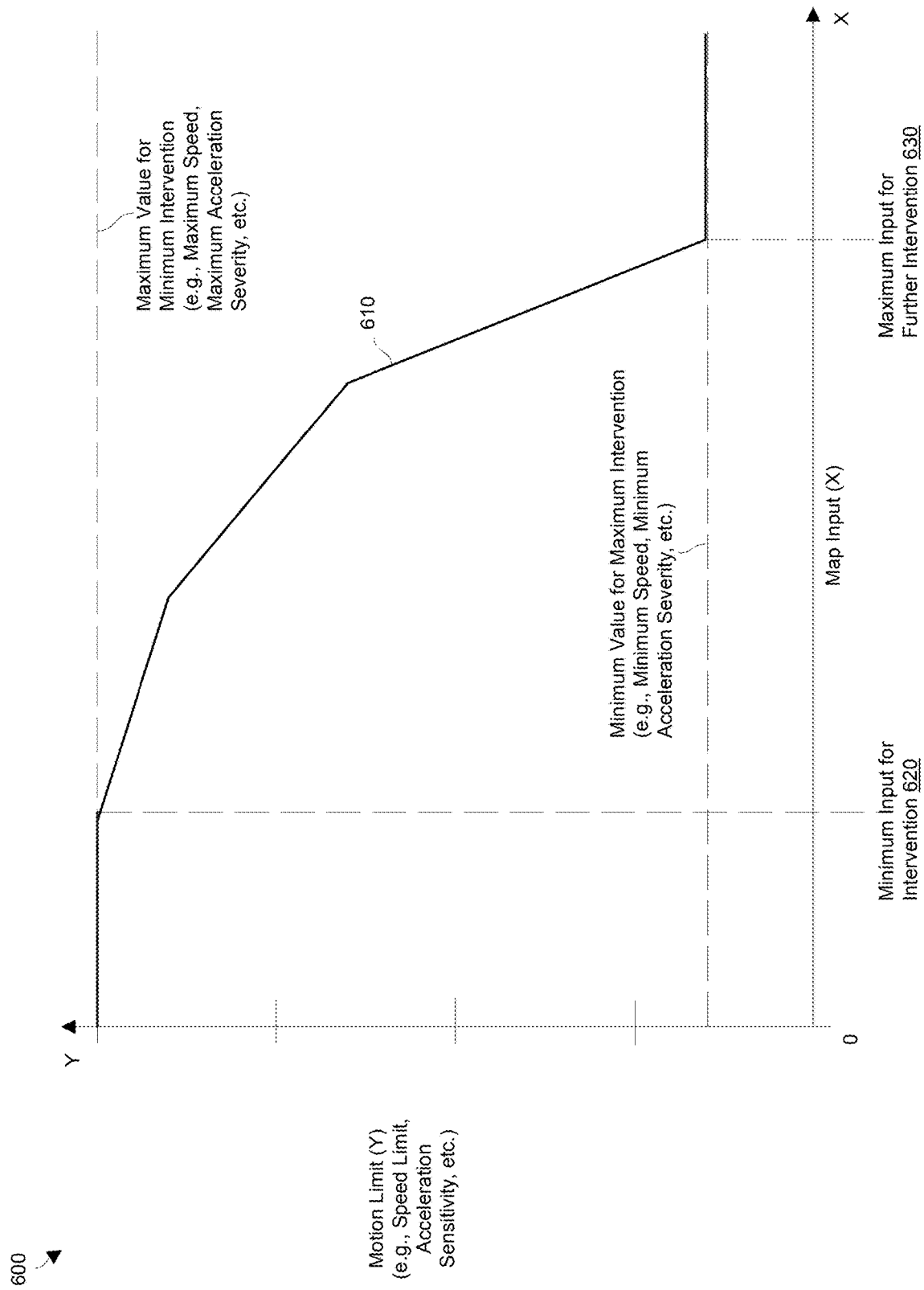
FIG. 6 is a chart of a motion limit curve in accordance with certain embodiments.

FIG. 6 shows a view 600 of an example motion limit map (or curve) 610 for the utility vehicle 100 in accordance with certain embodiments. Such a motion limit map 610 is suitable for mapping a map input (X), which is based on a set of current motion characteristics of the utility vehicle 100, to a motion limit (Y). The map input (X) is an indication of turning intensity (e.g., a measure of stability). Suitable motion limits (Y) include maximum allowed speed, maximum acceleration rate, maximum deceleration rate, and the like. Such a map 610 enables the amount of limiting adjustment(s) to be based on the intensity of the reduced stability event.

The map input (X) of the motion limit map 610, as just mentioned, is an indication of utility vehicle stability and is based on sensed motion from the set of sensors 412 (also see FIG. 4). Along these lines, the map input (X) increases as the severity of certain types of utility vehicle movement increases, e.g., roll about the longitudinal axis 120, pitch about the lateral axis 122, turning/cornering about the vertical axis 124, combinations thereof, etc. (also see FIG. 1).

The motion limit (Y) of the motion limit map 610 is a function of the map input (X). Along these lines, the motion limit (Y) decreases as the severity of the map input increases. In particular, the motion limit (Y) is capped while the map input (X) is below a certain minimum input 620 (i.e., minimum input before intervention). That is, the motion limit (Y) may remain unadjusted (e.g., at an initial or default value) until the map input (X) increases above a certain level.

If the map input (X) exceeds this minimum input 620, the motion limit (Y) decreases until the map input (X) reaches a certain maximum input 630 (i.e., maximum map input before further intervention). As shown in FIG. 6, the decrease in the motion limit (Y) may be gradual at lower map input values but decreases at a steeper rate at higher map input values.

If the map input (X) exceeds the maximum input 630, the motion limit map 610 relies on the utility vehicle 100 to employ one or more additional measures. For example, the utility vehicle 100 may disable the electric motor 230 (FIG. 2) and/or engage braking and thus bring the utility vehicle 100 to a full stop, may output an alert, may signal a central server, combinations thereof, etc.

For illustration purposes, suppose that the motion limit map 610 represents the response function for controlling the speed limit of the utility vehicle 100. Along these lines, as long as the map input (X) (which is an indication of vehicle stability) remains below the threshold 620, the speed limit of the utility vehicle 100 may remain at a maximum value (e.g., 18 mph).

However, if the map input (X) slightly exceeds the threshold 620, the motion limit map 610 indicates that the speed of the utility vehicle 100 is to be reduced. For example, the utility vehicle 100 may be slightly turning and, when such motion is sensed, the motion limit map 610 directs the speed limit to be reduced (e.g., from 18 mph to 16 mph).

It should be understood that, if the map input (X) exceeds the threshold 620 by a larger amount, the motion limit map 610 indicates that the speed of the utility vehicle 100 is to be reduced by a greater amount. For example, the utility vehicle 100 may be turning more severely and, when such motion is sensed, the motion limit map 610 directs the speed limit to be more aggressively reduced (e.g., to 14 mph), and so on.

Furthermore, if the map input (X) exceeds the threshold 620 by an extreme amount that exceeds the threshold 630, the motion limit map 610 indicates that the speed of the utility vehicle 100 is to be reduced by the maximum amount (e.g., 6 mph). Additionally, the utility vehicle 100 may perform other operations as mentioned above such as output a warning (e.g., flash an alert on a display, output an audio signal, combinations thereof, etc.), send an alert to a central station, and so on.

It should be understood that the utility vehicle 100 may utilize a similar motion limit map 610 for other motion limits. Such other motion limits include acceleration severity, deceleration severity, and so on.

It should be understood that the utility vehicle 100 may use alternatives to a mapping table of entries and a lookup process as described above. For example, in other arrangements, the utility vehicle 100 derives one or more speed metrics via a set of mathematical functions. Further details will now be provided with reference to FIG. 7.

Figure 7:
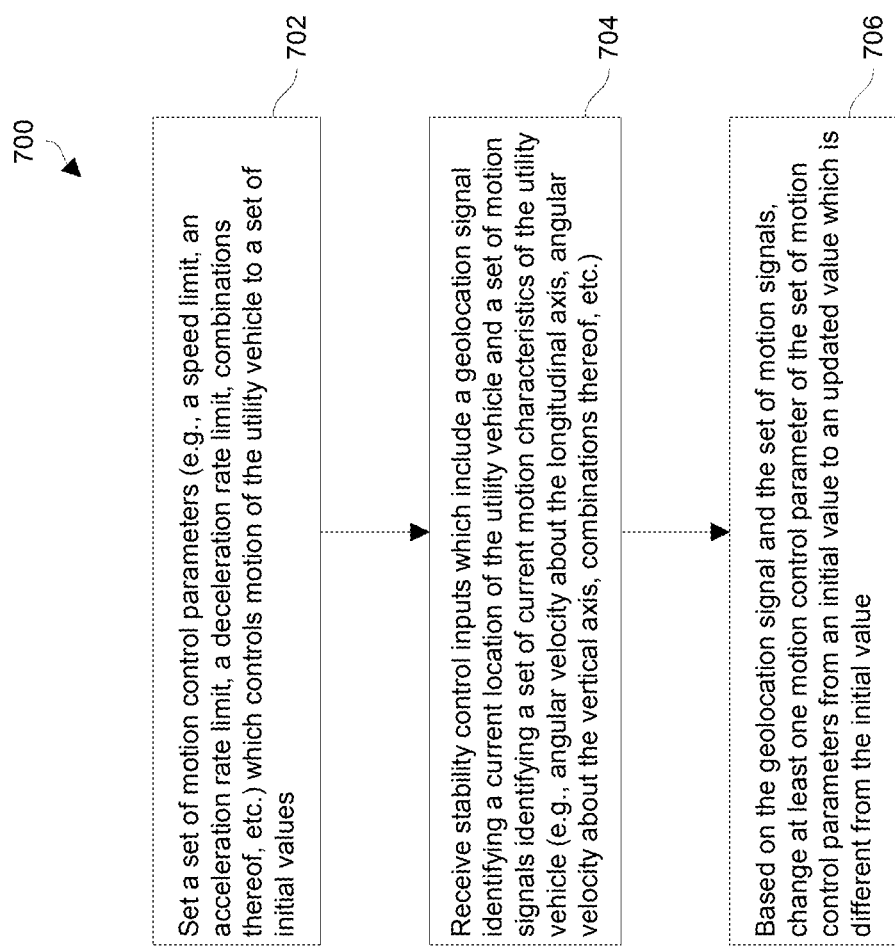
FIG. 7 is a flowchart of a procedure for motion control in accordance with certain embodiments.

FIG. 7 is a flowchart of a procedure 700 of controlling a utility vehicle (e.g., providing motion control) based on one or more current motion characteristics of the utility vehicle in accordance with certain embodiments. Such a procedure 700 may be performed by specialized circuitry of the utility vehicle such as by a motor controller, a BMS, an external device, other circuitry, combinations thereof, etc. (e.g., also see the controller 416 in FIG. 4).

At 702, the specialized circuitry sets a set of motion control parameters which controls motion of the utility vehicle to a set of initial values. For example, the specialized circuitry may impose a first speed limit, a first acceleration rate limit, and/or a first deceleration rate limit on the utility vehicle.

At 704, the specialized circuitry receives stability control inputs which include a geolocation signal identifying a current location of the utility vehicle and a set of motion signals identifying a set of current motion characteristics of the utility vehicle. The geolocation signal may include a GPS coordinate identifying current vehicle location to ascertain whether the utility vehicle is currently within a stability control geofence. Example motion characteristics include the current angular velocity of the utility vehicle about the longitudinal axis, current angular velocity of the utility vehicle about the lateral axis, and/or the current angular velocity of the utility vehicle about the vertical axis (also see FIG. 1).

At 706, the specialized circuitry changes, based on the geolocation signal and the set of motion signals, at least one motion control parameter of the set of motion control parameters which controls motion of the utility vehicle from an initial value to an updated value which is different from the initial value. For example, the specialized circuitry may reduce the maximum allowed speed, the acceleration rate limit, the deceleration rate limit, combinations thereof, etc.

It should be appreciated that some motor controllers may describe acceleration rates in seconds (e.g., the amount of seconds the controller will take to reach a commanded speed from an initial speed). Accordingly, a lower value means a higher severity. In this context, reducing a maximum acceleration rate that a motor controller imposes on the utility vehicle from a first acceleration rate to a second acceleration rate that is lower than the first acceleration rate means that the acceleration rate value is actually made higher (e.g., the motor controller may "reduce" the maximum acceleration rate by changing value of the acceleration rate from 8 s to 12 s).

It should be understood that the specialized circuitry continues to perform 704 and 706 in an ongoing manner. Accordingly, the values of the set of motion control parameters imposed by the utility vehicle may change over time based on various current motion characteristics of the utility vehicle. Further details will now be provided with reference to FIG. 8.

Figure 8:
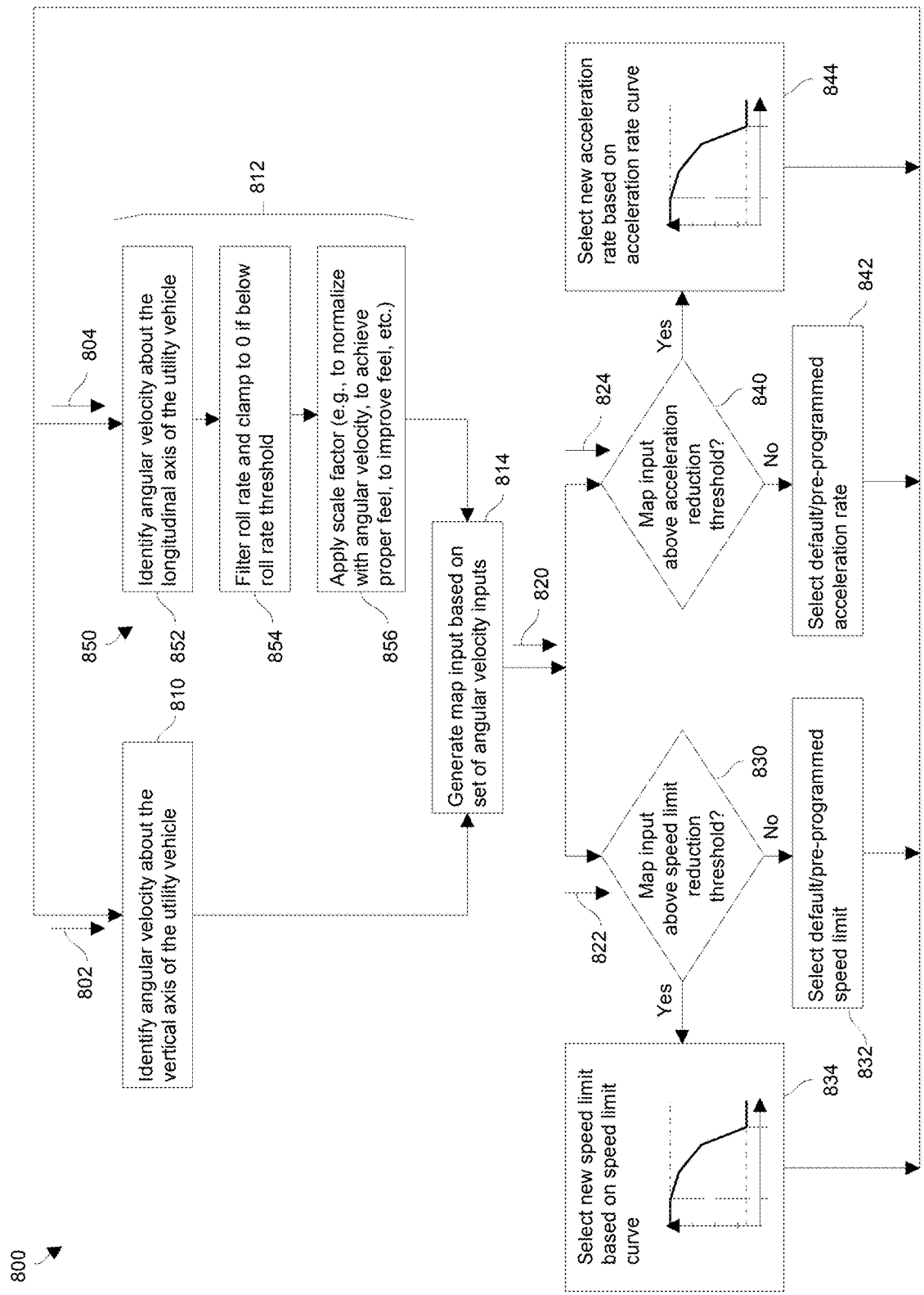
FIG. 8 is a flowchart of another procedure in accordance with certain embodiments.

FIG. 8 is a flowchart of a procedure 800 of controlling a utility vehicle (e.g., motion limiting) based on one or more current motion characteristics of the utility vehicle in accordance with certain embodiments. As with the procedure 700 (FIG. 7), the procedure 800 may be performed by specialized circuitry of the utility vehicle such as by a motor controller, a BMS, an external device, other circuitry, combinations thereof, etc. (e.g., also see the controller 416 in FIG. 4). The procedure 800 may be performed after a set of motion control parameters which control motion of the utility vehicle has been initially set (e.g., also see 702 in FIG. 7) and while the utility vehicle resides within a stability control geofence.

The procedure 800 begins with multiple paths 802, 804. The path 802 is proceeds along the left side of FIG. 8, and the path 804 proceeds along the right side of FIG. 8.

Regarding the path 802 on the left side, at 810, the specialized circuitry provides a current angular velocity metric for angular velocity about the vertical axis of the utility vehicle (e.g., for turning or cornering). Along these lines, the specialized circuitry receives a set of sensor signals from a set of sensors (e.g., see 704 in FIG. 7), and extracts a value for the current angular velocity metric from the set of sensor signals. For example, the specialized circuitry may obtain/retrieve a set of signals from a set of IMUs of the utility vehicle. Suitable units for the output of 810 is degrees per second.

Similarly, for the path 804 on the right side, at 812, the specialized circuitry provides a current angular velocity metric for angular velocity about the longitudinal axis of the utility vehicle (e.g., for roll). Again, the specialized circuitry supplies a value for the current angular velocity metric based on the set of sensor signals. Suitable units for the output of 812 is degrees per second.

At 814, the specialized circuitry generates a map input metric 820 from the current angular velocity metrics obtained by 810 and 812. In some arrangements, the specialized circuitry aggregates (or sums) the individual current angular velocity metrics from 810 and 812 to provide, as the map input metric 820, a combined (or overall) current angular velocity metric. In some arrangements, the map input metric 820 may be considered a measurement of vehicle stability (i.e., the lower the value the more stable the vehicle).

From 814, the specialized circuitry proceeds again down multiple paths 822, 824. The path 822 determines whether to use an adjusted speed limit or a default speed limit (e.g., pre-programmed by the manufacturer/supplier/user/etc.). The path 824 determines whether to use an adjusted acceleration rate limit or a default (or pre-programmed) acceleration rate limit.

In particular, at 830, the specialized circuitry compares the map input metric 820 to a speed limit reduction threshold. If the map input metric 820 is less than or equal to the speed limit reduction threshold, 830 proceeds to 832. However, if the map input metric 820 is greater than the speed limit reduction threshold, 830 proceeds to 834.

At 832, when the map input metric 820 is less than or equal to the speed limit reduction threshold, the specialized circuitry maintains the speed limit of the utility vehicle at the default speed limit (i.e., no intervention). In some arrangements, the motor controller of the utility vehicle persistently stores and uses the default speed limit and the specialized circuitry makes no adjustment. In some arrangements, the specialized circuitry manages the default speed limit and actively directs (e.g., commands) the motor controller to continue using the default speed limit.

At 834, when the map input metric 820 is greater than the speed limit reduction threshold, the specialized circuitry sets the speed limit of the utility vehicle based on the map input metric 820 (i.e., intervention). In some arrangements, the specialized circuitry accesses a map (or lookup table) to ascertain a particular speed limit based on the map input metric 820 (e.g., see FIG. 6). In other arrangements, the specialized circuitry algorithmically derives the particular speed limit using the map input metric 820 as an input. Other operations are suitable for selecting the speed limit of the utility vehicle based on the map input metric 820 (e.g., a combination of accessing a lookup table and applying an algorithm, etc.).

Likewise, at 840 of the path 824, the specialized circuitry compares the map input metric 820 to an acceleration reduction threshold. If the map input metric 820 is less than or equal to the acceleration reduction threshold, 840 proceeds to 842. On the other hand, if the map input metric 820 is greater than the speed limit reduction threshold, 840 proceeds to 844.

At 842, when the map input metric 820 is less than or equal to the acceleration reduction threshold, the specialized circuitry maintains the acceleration rate of the utility vehicle at the default acceleration rate. In some arrangements, the motor controller of the utility vehicle persistently stores and uses the default acceleration rate and the specialized circuitry makes no adjustment. In some arrangements, the specialized circuitry manages the default acceleration rate and actively directs the motor controller to use the default acceleration rate.

At 844, when the map input metric 820 is greater than the acceleration reduction threshold, the specialized circuitry sets the acceleration rate of the utility vehicle based on the map input metric 820. In some arrangements, the specialized circuitry accesses a map (or lookup table) to ascertain a particular acceleration rate based on the map input metric 820 (e.g., see FIG. 6). In other arrangements, the specialized circuitry algorithmically derives the particular acceleration rate using the map input metric 820 as an input (e.g., a metric may be determined using a mathematical function rather than a mapping table). Other operations are suitable for selecting the acceleration rate of the utility vehicle based on the map input metric 820 (e.g., a combination of accessing a lookup table and applying an algorithm, etc.).

Once paths 822 and 824 have completed, the procedure 800 starts again (i.e., repeats). In particular, the specialized circuitry returns to paths 802 and 804. Such operation continues in an ongoing manner while the utility vehicle is being driven. Accordingly, the utility vehicle continues to enjoy motion limiting based on a set of current motion characteristics of the utility vehicle.

At this point, it should be appreciated that, in some respects, the procedure 800 is a more advanced version of at least a portion of the procedure 700 (also see FIG. 7). Along these lines, 810 and 812 correspond to receiving a set of motion signals (also see 704 in the procedure 700 of FIG. 7). Such a set of motion signals indicate a set of current motion characteristics of the utility vehicle (e.g., a set of angular velocities about different axes of the utility vehicle). Additionally, or alternatively, the set of motion signals indicate and evaluate in other paths other motion-related aspects of the utility vehicle such as vehicle pitch, how much the steering wheel is turned, how fast the axles are rotating, whether the utility vehicle is skidding, and so on.

Additionally, 814 through 844 correspond to operations involved in changing at least one motion control parameter of the set of motion control parameters which controls motion of the utility vehicle from an initial value to an updated value which is different from the initial value (also see 706 in the procedure 700 of FIG. 7). Here, performing path 822 may result in adjusting the speed limit of the utility vehicle, and performing path 824 may result in adjusting the acceleration rate of the utility vehicle.

It should be appreciated that the procedure 800 was described above as including paths 802 and 804 in accordance with certain embodiments and by way of example only. In other embodiments, there are different paths and/or a different number of paths to generate the map input. For example, in some embodiments, the procedure 800 identifies angular velocity about the lateral axis of the utility vehicle, which may then be clamped/noise-filtered/scaled/etc., and the map input is at least in part based on the angular velocity about the lateral axis. Other metrics and combinations of metrics (e.g., steering wheel rotation, tire slippage/skidding, vehicle vibration, combinations thereof, etc. are suitable for use as well.

It should be further appreciated that, in other embodiments, the procedure 800 is constructed and arranged to adjust different motion control parameters and/or a different number motion control parameters (e.g., one control parameter, three control parameters, and so on). For example, the procedure 800 may be configured to further adjust the deceleration rate of the utility vehicle. As another example, the procedure 800 may be configured to only adjust the speed limit and the deceleration rate. As yet another example, the procedure 800 may be configured to only adjust the speed limit, and so on.

It should be understood that the specialized circuitry may perform additional and/or more detailed operations (e.g., for fine tuning, normalization, improved user satisfaction, combinations thereof, etc.). Such operation may improve motion control effectiveness compared to simply using raw sensor measurements.

For example, 812 may include a series of sub-activities 850. At 852, the specialized circuitry identifies a current angular velocity metric for the utility vehicle about the longitudinal axis (e.g., for roll). At 854, the specialized circuitry clamps (or zeroes out) the magnitude of the current angular velocity metric if the currently identified value is less than a predefined roll rate threshold. At 856, the specialized circuitry applies a scale factor to the value (e.g., if the angular velocity metric was clamped to zero, the value is still zero after scaling).

In some embodiments, the scaling factor is dynamically calculated based on the current top speed setting and/or other factors. In a particular arrangement, the specialized circuitry uses a first scale factor for top speed settings for a first range (e.g., 16 mph or less) and a second scale factor for top speed settings for a second range (e.g., 25 mph or more), with linear interpolation in between those points. Such an arrangement avoids having a single middle ground that would make the logic too intrusive at lower speeds and not intrusive enough at higher speeds.

Moreover, it should be understood that the procedure 800 includes parallel (or side-by-side) paths at certain times. In accordance with certain embodiments, such paths are executed by a single processor (e.g., via time sliced multitasking). In accordance with other embodiments, such paths are executed by respective processing circuits (e.g., via parallel processing). Other configurations are suitable for use as well (e.g., time slicing and parallel processing).

In some embodiments, the motor controller 220 offers several (e.g., many) motion control parameters that can be set to a first set of values to provide certain performance, a second set of values to provide more conservative performance (e.g., less aggressive cornering), a third set of values to provide even more conservative performance (e.g., extremely stable cornering), and so on. Such motion control parameters can be changed dynamically to modify how the utility vehicle 100 performs.

In some embodiments, the specialized circuitry offers different levels of motion control parameter accessibility. Along these lines, the supplier of the motor controller may have "developer level" parameter accessibility, the vehicle manufacturers/dealers may have "technician level" parameter accessibility, operators/users may have "operator level" parameter accessibility, etc.

At a lower level of parameter accessibility (e.g., lower than "developer level"), the utility vehicle 100 may offer the ability to set certain intervention thresholds and/or multiple motion control parameters with a single motion (or stability) control setting. Such a feature enables multiple motion control metrics to be adjusted via just one setting. For example, the setting offered at the "operator level" level may be "off", "mild assist", "moderate assist", and "heavy assist".

When the operator sets the motion control setting to "off", motion control based on current motion characteristics is disabled. Accordingly, the utility vehicle 100 simply operates using default values while residing in a stability control geofence.

When the operator sets the motion control setting to "mild assist", motion control based on current motion characteristics is enabled and the utility vehicle 100 provides a mild application of motion control based on current motion characteristics while residing in a stability control geofence. Along these lines, for a particular map input (or stability measure), the specialized circuitry may use certain intervention thresholds and mildly adjust the values for certain parameters. For example, the specialized circuitry may set the stability threshold/map/max deg/s to 20/25/35 deg/s.

When the operator sets the motion control setting to "moderate assist", motion control based on current motion characteristics is enabled and the utility vehicle 100 provides a moderate application of motion control based on current motion characteristics while residing in a stability control geofence. Along these lines, for the particular map input, the specialized circuitry may use certain other intervention thresholds and moderately adjust the values for certain parameters.

For example, the specialized circuitry may set the stability threshold/map/max deg/s to 15/18/30 deg/s. Here, the stability threshold is used as a reference (e.g., see FIG. 8), map is the map input, and max is the maximum or upper limit.

When the operator sets the motion control setting to "heavy assist", motion control based on current motion characteristics is enabled and the utility vehicle 100 provides a heavy application of motion control based on current motion characteristics while residing in a stability control geofence. Along these lines, for the particular map input, the specialized circuitry may use yet other intervention thresholds and heavily adjust the values for certain parameters. For example, the specialized circuitry may set the stability threshold/map/max deg/s to Oct. 15, 2020 deg/s.

Of course, other metrics are suitable for use as well. Additionally, other threshold/parameter groupings are suitable for use as well.

As described above, improved techniques are directed to controlling a utility vehicle 100 based on the vehicle's current location and one or more current motion characteristics (e.g., vehicle pitch, vehicle roll, angular velocity about a particular axis, steering wheel rotation, combinations thereof, etc.). Along these lines, the utility vehicle 100 may operate within a geographical region which includes one or more stability control geofences. When the utility vehicle 100 enters such a stability control geofence, the utility vehicle 100 performs a stability assessment (e.g., an evaluation of current motion characteristics) and, if the stability assessment indicates that the utility vehicle 100 has encountered a reduced stability event (e.g., sharp cornering behavior, a steep forward pitch, extensive steering wheel rotation, combinations thereof, etc.), the utility vehicle 100 updates a set of motion control parameters which controls vehicle motion to improve vehicle stability. Example motion control parameters include the vehicle's speed limit, acceleration rate, deceleration rate, and the like. With the utility vehicle 100 being configured to change the value of one or more motion control parameters in such a situation, the utility vehicle 100 may enjoy less restrictive motion control in other situations for convenience (e.g., when traveling outside of any stability control geofence, when traveling within a stability control geofence while under an intensity threshold, etc.).

While various embodiments of the present disclosure have been particularly shown and described, it will be understood by those skilled in the art that various changes in form and details may be made therein without departing from the spirit and scope of the present disclosure as defined by the appended claims.

Along these lines, the improvements disclosed herein are applicable to various types of vehicular apparatus/equipment. Example apparatus/equipment include speed-controlled vehicles and torque-controlled vehicles.

Additionally, in some embodiments, the geolocation signal merely indicates that the vehicle has entered a stability control geofence irrespective of whether GPS technology is employed. For example, in non-GPS embodiments, the geolocation signal indicates whether the vehicle has entered a stability control geofence based on Bluetooth beacon detection, RF signaling, combinations thereof, etc. That is, the current location of the vehicle is simply either within a stability control geofence or not in a stability control geofence.

Furthermore, in some embodiments, the above-described motion control features may be enabled/disabled selectively. In particular, such motion control features may be disabled in certain vehicles models/platforms/etc. but enabled in others (e.g., based on vehicle application, licensing, and so on).

In accordance with certain embodiments, utility vehicles enjoy motion limiting based on current vehicle motion characteristics. Examples of such utility vehicles include golf carts, personal transport vehicles, commercial vehicles, industrial vehicles, specialized vehicles, and the like which can experience dynamic selective reduction of maximum motion control parameters when the utility vehicles are within a stability control geofence and turning (e.g., during cornering). In fact, any industry or product to which stability control may be applied can use the features disclosed herein.

It should be appreciated that vehicles in fleet golf, industrial, or commercial applications typically have optional GPS-based fleet management systems for remote vehicle monitoring/management. These fleet management systems will often provide a geofencing feature as part of a fleet management application. This feature allows for designating specific geographical areas and establishing certain rules to apply when vehicles enter these areas. Stability control features may exist which help facilitate safe and reliable operation of the vehicle. These features may be adjustable in restrictiveness.

Prior to the improvements disclosed herein, the above-mentioned adjustments are capable of being made only prior to driving the vehicles. Unfortunately, the more restrictive these features are configured to be, the more intrusive they are upon the normal driving experience. For example, one option is to set stability control conservatively at all times, but this option infringes on driving experience. That is, stability control may help facilitate safe and reliable vehicle operation, but to have the greatest effect, the above-mentioned adjustments are configured conservatively and prior to driving which therefore degrades the driving experience when such adjustments are not necessary. Of course, another option is to set stability control to be non-intrusive at all times, but this option fails to have desired effect on driving.

However, with the improvements disclosed herein, there is location based dynamic vehicle cornering behavior. That is, in accordance with certain embodiments, because stability control reduces performance, it is advantageous to use geofencing to tailor stability control tuning per geographic location instead of using universal settings. In some embodiments, there is selective alteration of restrictiveness of vehicle stability control features based on a vehicle's GPS position.

By dynamically adjusting the restrictiveness of stability control features based on GPS position in relation to a pre-configured geofence, stability features can be configured to aggressively facilitate safe and reliable operation of the vehicle in areas where that is necessary without intruding upon the driving experience in areas where a gentler stability control configuration is sufficient.

In accordance with certain embodiments, a "geofence" area is configured and known by the vehicle's GPS-based fleet management system. The GPS device commands one or more parameter settings related to stability control features on a vehicle data network based on whether the vehicle's GPS position is within a geofence area that is configured to modify stability control features. If the vehicle is not located in a geofence area, the GPS device would relinquish control of stability control parameters to the vehicle's default or user-selected stability control parameters. One example of a practical use would be allowing non-intrusive stability control settings in the open area around a golf course vehicle maintenance facility, while configuring a geofence around a tight curve in a cart path to decrease the possibility of an incident occurring. Although the example environment described above is a golf course and the utility vehicle is a golf cart, it should be appreciated that the features and improvements disclosed herein can be implemented on any products/vehicle.

The improvements disclosed herein may be impactful for electric powered vehicles, rental services and other businesses utilizing vehicles as a form of transportation or equipment. Other industries include those for heavy turf care equipment (large mowers) and for similar systems for speed limiting, deck operation, or other responses. Other types of vehicles include hybrid vehicles, internal combustion engine vehicles, and so on. Such modifications and enhancements are intended to belong to various embodiments of the disclosure.

What is claimed is:

1. A method of controlling a utility vehicle, the method comprising:
setting a set of motion control parameters which controls motion of the utility vehicle to a set of initial values;
receiving stability control inputs which include a geolocation signal identifying a current location of the utility vehicle and a set of motion signals identifying a set of current motion characteristics of the utility vehicle; and
based on the geolocation signal and the set of motion signals, changing at least one motion control parameter of the set of motion control parameters which controls motion of the utility vehicle from an initial value to an updated value which is different from the initial value.

2. The method of claim 1 wherein the utility vehicle includes global positioning system (GPS) circuitry constructed and arranged to provide the geolocation signal;
wherein changing the at least one motion control parameter includes:
acquiring a GPS coordinate from the geolocation signal, the GPS coordinate identifying the current location of the utility vehicle, and
performing a geofence detection operation based on the GPS coordinate, a result of the geofence detection operation indicating that the utility vehicle is currently within a stability control geofence.

3. The method of claim 2 wherein the utility vehicle further includes a set of sensors constructed and arranged to provide the set of motion signals; and
wherein changing the at least one motion control parameter further includes:
acquiring a set of motion metrics from the set of motion signals, the set of motion metrics identifying the set of current motion characteristics of the utility vehicle, and
performing a stability assessment operation based on the set of motion metrics, a result of the stability assessment operation indicating that the utility vehicle is currently experiencing a reduced stability event.

4. The method of claim 3 wherein changing the at least one motion control parameter further includes:
performing an adjustment operation that adjusts a particular motion control parameter of the set of motion control parameters in response to the result of the geofence detection operation indicating that the utility vehicle is currently within a stability control geofence and the result of the stability assessment operation indicating that the utility vehicle is currently experiencing the reduced stability event.

5. The method of claim 4 wherein the utility vehicle includes an electric traction motor constructed and arranged to provide utility vehicle propulsion and motor control circuitry constructed and arranged to control the electric traction motor; and
wherein performing the adjustment operation that adjusts the particular motion control parameter includes:
reducing a speed limit imposed by the motor control circuitry on the electric traction motor while the utility vehicle is currently within the stability control geofence and while the utility vehicle is currently experiencing the reduced stability event.

6. The method of claim 3 wherein performing the stability assessment operation includes:
while the utility vehicle is within the stability control geofence, generating an assessment signal indicating that the utility vehicle is currently experiencing adverse angular movement about at least one axis.

7. The method of claim 6 wherein the set of sensors includes an inertial measurement unit (IMU) constructed and arranged to provide a set of angular motion metrics; and
wherein generating the assessment signal includes:
detecting that the utility vehicle is currently experiencing angular movement intensity which exceeds an angular movement intensity threshold based on the set of angular motion metrics.

8. The method of claim 6 wherein the set of sensors includes a steering wheel sensor constructed and arranged to provide a steering wheel rotation measurement; and
wherein generating the assessment signal includes:
detecting that a steering wheel of the utility vehicle is currently rotated by at least a predefined amount based on the steering wheel rotation measurement.

9. The method of claim 6 wherein the set of sensors includes a set of tire speed sensors constructed and arranged to provide a set of tire speed measurements; and
wherein generating the assessment signal includes:
detecting that the utility vehicle is currently moving adversely by at least a predefined amount based on the set of tire speed measurements.

10. The method of claim 3 wherein the set of motion metrics includes a first angular speed metric for utility vehicle angular speed about a vertical axis of the utility vehicle and a second angular speed metric for utility vehicle angular speed about a longitudinal axis of the utility vehicle; and
wherein performing the stability assessment operation based on the set of motion metrics includes:
generating, as at least a portion of the result of the stability assessment operation, a derived angular speed metric based on at least one of the first angular speed metric and the second angular speed metric.

11. The method of claim 10 wherein changing the at least one motion control parameter further includes:
comparing the derived angular speed metric to a predefined threshold, and
lowering a particular motion control parameter from the initial value to the updated value in response to the derived angular speed metric exceeding the predefined threshold.

12. The method of claim 3, further comprising, while the utility vehicle is within the stability control geofence and prior to changing the at least one motion control parameter of the set of motion control parameters:

acquiring an earlier set of motion metrics from the set of motion signals, the earlier set of motion metrics identifying an earlier set of current motion characteristics of the utility vehicle, performing an earlier stability assessment operation based on the earlier set of motion metrics, a result of the earlier stability assessment operation indicating that the utility vehicle is currently not experiencing a reduced stability event, and maintaining the at least one motion control parameter of the set of motion control parameters at the initial value in response to the result of the earlier stability assessment operation indicating that the utility vehicle is currently not experiencing a reduced stability event.

13. The method of claim 12 wherein the earlier set of motion metrics indicates that the utility vehicle is currently experiencing angular movement intensity which is below an angular movement intensity threshold, and wherein the set of motion metrics indicates that the utility vehicle is currently experiencing angular movement intensity which is above the angular movement intensity threshold.

14. The method of claim 3, further comprising:

after the at least one motion control parameter of the set of motion control parameters has been changed from the initial value to the updated value and after the utility vehicle has left the stability control geofence, performing a reset operation that resets the at least one motion control parameter of the set of motion control parameters from the updated value back to the initial value.

15. The method of claim 14, further comprising:

performing a second geofence detection operation based on a second GPS coordinate, a result of the second geofence detection operation indicating that the utility vehicle has re-entered the stability control geofence, acquiring a new set of motion metrics from the set of motion signals, the new set of motion metrics identifying a new set of current motion characteristics of the utility vehicle, performing a new stability assessment operation based on the new set of motion metrics, a result of the new stability assessment operation indicating that the utility vehicle is currently not experiencing a reduced stability event, and maintaining the at least one motion control parameter of the set of motion control parameters at the initial value in response to the result of the second geofence detection operation indicating that the utility vehicle has re-entered the stability control geofence and the result of the stability assessment operation indicating that the utility vehicle is currently not experiencing a reduced stability event.

16. Electronic circuitry to control a utility vehicle, the electronic circuitry comprising:

an electric motor;

motor control circuitry constructed and arranged to operate the electric motor for vehicle propulsion; and a controller coupled with the motor control circuitry, the controller being constructed and arranged to perform a method of:

setting, within the motor control circuitry, a set of motion control parameters which controls motion of the utility vehicle to a set of initial values, receiving stability control inputs which include a geolocation signal identifying a current location of the utility vehicle and a set of motion signals identifying a set of current motion characteristics of the utility vehicle, and based on the geolocation signal and the set of motion signals, changing, within the motor control circuitry, at least one motion control parameter of the set of motion control parameters which controls motion of the utility vehicle from an initial value to an updated value which is different from the initial value.

17. A utility vehicle, comprising:

a battery management system (BMS) having a lithium battery;

a utility vehicle propulsion system constructed and arranged to provide utility vehicle propulsion using electric power from the lithium battery; and electronic circuitry coupled with the BMS and the utility vehicle propulsion system, the electronic circuitry being constructed and arranged to perform a method of:

setting, within the utility vehicle propulsion system, a set of motion control parameters which controls motion of the utility vehicle to a set of initial values, receiving stability control inputs which include a geolocation signal identifying a current location of the utility vehicle and a set of motion signals identifying a set of current motion characteristics of the utility vehicle, and based on the geolocation signal and the set of motion signals, changing, within the utility vehicle propulsion system, at least one motion control parameter of the set of motion control parameters which controls motion of the utility vehicle from an initial value to an updated value which is different from the initial value.

\* \* \* \* \*